(12) United States Patent
Jacobs

(10) Patent No.: US 8,925,689 B2
(45) Date of Patent: Jan. 6, 2015

(54) SYSTEM HAVING A PLURALITY OF ELEVATOR CABS AND COUNTERWEIGHTS THAT MOVE INDEPENDENTLY IN DIFFERENT SECTIONS OF A HOISTWAY

(71) Applicant: Smart Lifts, LLC, Menlo Park, CA (US)

(72) Inventor: Justin Jacobs, Menlo Park, CA (US)

(73) Assignee: Smart Lifts, LLC, Menlo Park, CA (US)

( * ) Notice: Subject to any disclaimer, the term of this patent is extended or adjusted under 35 U.S.C. 154(b) by 0 days.

(21) Appl. No.: 13/952,528

(22) Filed: Jul. 26, 2013

(65) Prior Publication Data

US 2013/0306408 A1 Nov. 21, 2013

Related U.S. Application Data

(63) Continuation-in-part of application No. 13/850,107, filed on Mar. 25, 2013, which is a continuation of application No. 13/009,701, filed on Jan. 19, 2011, now Pat. No. 8,430,210.

(51) Int. Cl.
| | |
|---|---|
| *B66B 11/08* | (2006.01) |
| *B66B 17/12* | (2006.01) |
| *B66B 7/06* | (2006.01) |
| *B66B 9/00* | (2006.01) |
| *B66B 11/00* | (2006.01) |

(52) U.S. Cl.
CPC .............. *B66B 9/00* (2013.01); *B66B 11/0095* (2013.01); *B66B 11/009* (2013.01); *B66B 17/12* (2013.01)
USPC ........... 187/249; 187/258; 187/266; 187/404; 187/411

(58) Field of Classification Search
CPC ...... B66B 11/075; B66B 11/06; B66B 11/08; B66B 11/009; B66B 11/0095; B66B 7/06; B66B 9/00

USPC ............... 187/249, 409, 257, 258, 259, 266
See application file for complete search history.

(56) References Cited

U.S. PATENT DOCUMENTS 1,566,385 A * 12/1925 Dunn ............................. 187/254
1,837,643 A * 12/1931 Anderson ...................... 187/249

(Continued)

FOREIGN PATENT DOCUMENTS

| EP | 228513 A1 * | 7/1987 | .............. B66B 11/06 |
| EP | 1439145 A1 * | 7/2004 | .............. B66B 11/08 |

(Continued)

OTHER PUBLICATIONS

PCT International Search Report and Written Opinion, PCT Application No. PCT/US2011/063210, Apr. 20, 2012, ten pages.

*Primary Examiner* — Michael Mansen
*Assistant Examiner* — Stefan Kruer
(74) *Attorney, Agent, or Firm* — Intellectual Property Law Group LLP

(57) ABSTRACT

An elevator system which utilizes a plurality of independently moving cabs and counterweights in each elevator shaft. Each cab is connected to one or more spatially separated counterweights at different counterweight connection points. The connection points are horizontally shifted on different cabs in order to prevent interference between cabs, cables, pulleys and counterweights. The top cab may have one counterweight cable and may be connected to one or more counterweights by connection points on the roof of the cab. The cabs are mounted on two opposing vertical guide rails, and each guide rail is mounted at the center of one side of the elevator shaft. The system includes a motor attached to each of the cabs by one or more lift cables to facilitate the independent movement of all cabs. Existing buildings can also be retrofit for compatibility with the present invention.

60 Claims, 28 Drawing Sheets

(56) References Cited

U.S. PATENT DOCUMENTS

| | | | |
|---|---|---|---|
| 3,658,155 A | 4/1972 | Salter | |
| 4,356,890 A | 11/1982 | Smart | |
| 4,458,788 A | 7/1984 | LePore | |
| H702 H | 11/1989 | Shively et al. | |
| 1,896,776 A | 2/1993 | James | |
| 1,896,777 A | 2/1993 | James | |
| 5,419,414 A | 5/1995 | Sakita | |
| 5,526,901 A | 6/1996 | Salmon | |
| 5,663,538 A * | 9/1997 | Sakita | 187/382 |
| 6,854,564 B2 | 2/2005 | Reuter et al. | |
| 7,032,716 B2 | 4/2006 | Meyle et al. | |
| 7,353,913 B2 | 4/2008 | Hashiguchi | |
| 7,357,226 B2 | 4/2008 | Sakita | |
| 7,461,721 B2 | 12/2008 | Aulanko et al. | |
| 7,484,596 B2 * | 2/2009 | Aulanko et al. | 187/266 |
| 8,047,333 B2 | 11/2011 | Finschi | |
| 8,052,124 B2 | 11/2011 | Monzon et al. | |
| 8,052,820 B2 | 11/2011 | O'Donnell et al. | |
| 8,083,033 B2 | 12/2011 | Kallioniemi et al. | |
| 8,087,497 B2 | 1/2012 | Fargo | |
| 8,091,687 B2 | 1/2012 | Hamaji | |
| 8,103,105 B2 | 1/2012 | Kuroda et al. | |
| 8,109,367 B2 | 2/2012 | Ach | |
| 8,113,319 B2 | 2/2012 | Anttila et al. | |
| 8,118,138 B2 | 2/2012 | Aulanko et al. | |
| 8,118,139 B2 | 2/2012 | Chen | |
| 8,123,002 B2 | 2/2012 | Smith et al. | |
| 8,123,020 B2 | 2/2012 | Fang et al. | |
| 8,127,893 B2 | 3/2012 | Mustalahti et al. | |
| 8,136,637 B2 | 3/2012 | Coquerelle et al. | |
| 8,141,684 B2 | 3/2012 | Bjorni et al. | |
| 8,141,685 B2 | 3/2012 | Utsunomiya | |
| 8,146,714 B2 | 4/2012 | Blasko | |
| 8,151,950 B2 | 4/2012 | Fargo | |
| 8,157,058 B2 | 4/2012 | Ach | |
| 8,162,109 B2 | 4/2012 | Amano | |
| 8,172,041 B2 | 5/2012 | Kawasaki et al. | |
| 8,177,032 B2 | 5/2012 | Hashimoto | |
| 8,177,036 B2 | 5/2012 | Stanley et al. | |
| D662,002 S | 6/2012 | Lee et al. | |
| 8,205,720 B2 | 6/2012 | Barneman | |
| 8,205,721 B2 | 6/2012 | Korhonen et al. | |
| 8,205,722 B2 | 6/2012 | Suihkonen et al. | |
| 8,210,320 B2 | 7/2012 | Ach | |
| 8,235,178 B2 | 8/2012 | Kocher | |
| 8,235,179 B2 | 8/2012 | Valjus et al. | |
| 8,235,180 B2 | 8/2012 | Kattainen et al. | |
| 8,235,199 B2 | 8/2012 | Illedits et al. | |
| 8,240,453 B2 | 8/2012 | Miyaji | |
| 8,251,186 B2 | 8/2012 | Webster et al. | |
| D667,745 S | 9/2012 | Wu | |
| 8,256,579 B2 | 9/2012 | Jia | |
| 8,256,852 B2 | 9/2012 | Qiu | |
| 8,261,885 B2 | 9/2012 | Ketoviita et al. | |
| 8,261,886 B2 | 9/2012 | Kigawa et al. | |
| 8,267,224 B2 | 9/2012 | Gremaud et al. | |
| 8,272,481 B2 | 9/2012 | Tracey et al. | |
| 8,272,482 B2 | 9/2012 | Takahashi et al. | |
| 8,276,715 B2 | 10/2012 | Smith et al. | |
| 8,286,778 B2 | 10/2012 | Grobbel | |
| 8,297,413 B2 | 10/2012 | Kigawa et al. | |
| D670,747 S | 11/2012 | Stroud et al. | |
| 8,307,952 B2 | 11/2012 | Fargo et al. | |
| 8,307,953 B2 | 11/2012 | Ferreira | |
| 2003/0000778 A1 | 1/2003 | Smith et al. | |
| 2003/0155185 A1 * | 8/2003 | Nomura et al. | 187/266 |
| 2004/0094371 A1 | 5/2004 | Augugliaro | |
| 2005/0279584 A1 | 12/2005 | Reuter et al. | |
| 2007/0181374 A1 | 8/2007 | Mueller | |
| 2008/0041668 A1 * | 2/2008 | Kuttel et al. | 187/266 |
| 2008/0093177 A1 * | 4/2008 | Fargo | 187/249 |
| 2008/0142308 A1 * | 6/2008 | Kocher | 187/249 |
| 2008/0142310 A1 | 6/2008 | Kocher | |
| 2008/0149426 A1 | 6/2008 | Kocher | |
| 2008/0149430 A1 * | 6/2008 | De Angelis | 187/251 |
| 2011/0240415 A1 | 10/2011 | Loiselet et al. | |
| 2012/0018598 A1 * | 1/2012 | Webster et al. | 248/201 |
| 2013/0118837 A1 | 5/2013 | Altenburger et al. | |

FOREIGN PATENT DOCUMENTS

| | | | |
|---|---|---|---|
| EP | 1564177 | 8/2005 | |
| FR | WO 2010/663905 | 6/2010 | |
| JP | 04089787 A * | 3/1992 | B66B 9/02 |
| JP | 2000/351556 | 12/2000 | |
| JP | 2002-037544 | 2/2002 | |
| JP | 3252575 | 2/2002 | |
| JP | 2004-155519 | 6/2004 | |
| JP | 2004/256275 | 9/2004 | |
| JP | 2006-027755 | 2/2006 | |
| WO | WO 9829326 A1 * | 7/1998 | B66B 11/08 |
| WO | WO 2005/056457 | 6/2005 | |
| WO | WO 2006/113153 | 10/2006 | |
| WO | WO 2010/061036 | 6/2010 | |

* cited by examiner

| Floors | S1 | S2 | S3 | | S4 |
|---|---|---|---|---|---|
| A3 | 1 | 1 | | Attic Mechanical Equipment and Storage Space | |
| A2 | 2 | 2 | | | 130 |
| A1 | 3 | 3 | | | |
| 120 | 4 | 4 | | | ↑ |
| 117 | | | | | |
| 113 | | | | Company A | A1 |
| 110 | | | | | |
| 106 | | | | | |
| 101 | ↑ | | | | ↓ |
| 100 | 1 | | | | |
| 97 | ↓ | | | | |
| 93 | | | | Company B | B1 |
| 90 | | 5 | | | |
| 86 | | | | | B2 |
| 81 | | | | | ↓ |
| 80 | | 6 | 11 | | |
| 77 | ↑ | | | | ↑ C1 ↓ |
| 73 | 2 | | | Company C | |
| 70 | ↓ | 7 | 12 | | ↑ |
| 66 | | | | | C2 |
| 61 | | | | | ↓ |
| 60 | | 8 | 13 | | |
| 57 | | | | | |
| 53 | ↑ | | | | D1 |
| 50 | 3 | 9 | 14 | Company D | ↓ |
| 46 | ↓ | | | | ↑ |
| 41 | | | | | D2 |
| 40 | | 10 | 15 | | ↑ |
| 37 | | | | | |
| 33 | | | | Company E | E1 |
| 30 | ↑ | | 16 | | ↑ |
| 26 | 4 | | | | E2 |
| 21 | ↓ | | | | ↓ |
| 20 | | | | | ↑ |
| 16 | | | | | F1 |
| 13 | | | | Company F | ↑ |
| 10 | | | | | F2 |
| 5 | | | | | ↓ |
| 1 | 1 | | 17 | Numerous Retail Companies G | |
| B1 | 2 | | 18 | | |
| B2 | 3 | | 19 | Basement Car Parking | |
| B3 | 4 | | 20 | | |

FIG. 12

SYSTEM HAVING A PLURALITY OF ELEVATOR CABS AND COUNTERWEIGHTS THAT MOVE INDEPENDENTLY IN DIFFERENT SECTIONS OF A HOISTWAY

CROSS-REFERENCE TO RELATED APPLICATIONS

This application claims priority from and is a continuation-in-part of co-pending U.S. application Ser. No. 13/850,107, filed Mar. 25, 2013, which is a continuation of U.S. application Ser. No. 13/009,701 filed Jan. 19, 2011, now U.S. Pat. No. 8,430,210, each of which is incorporated herein by reference in its entirety. This application is also related to provisional U.S. Application No. 61/829,996, filed May 31, 2013, which is hereby incorporated by reference in its entirety.

FIELD OF INVENTION

The invention generally relates to an elevator system that has a plurality of elevator cabs and counterweights which move independently of each other in different sections of the same hoistway.

BACKGROUND

Current tall buildings have many elevator hoistways, but each hoistway only has one cab operating in that hoistway with one counterweight cable attached to the top center of the cab. Therefore, only one cab services each floor throughout the entire hoistway, and the general public normally has access to every cab and every floor in the entire building. This situation leads to inefficiencies for building owners, developers, and operators who would like to construct many fewer elevator hoistways and operate many more elevator cabs in different vertical sections of each hoistway. As land increases in value in desirable urban locations, the financial pressure to construct taller and taller buildings will also increase. Already over 15 buildings worldwide have been constructed, each with more than 100 floors, and at least one of these buildings exceeds 150 floors. Ten more buildings over 100 floors are already under construction, and twelve more are currently planned. If the number of elevator hoistways and their associated lobbies in these and other very tall buildings can be minimized, and the number of elevator cabs that operate in such elevator hoistways can be maximized, then the value, efficiencies, desirabilities and viability of these very expensive tall buildings can also be maximized.

The current situation also leads to inefficiencies and dissatisfactions for companies or individuals that lease or own many adjoining floors in a tall building. Many of them would like their employees, occupants and guests to be able to access all of their adjoining floors without having to take a public elevator between such floors. Most modern companies who lease or own multiple adjoining floors in a tall building would like to have one or more private elevators for all of its employees and guests to use, for reasons of privacy, security, efficiency, and commonality. The same is true for tall residential buildings, where one individual or family leases or owns several adjoining floors. Many employees currently waste a lot of time, effort and their company's money by having to leave the company's premises, go out into a public lobby, wait for a crowded public elevator cab moving the entire length of a long hoistway, and then having to re-enter the company's premises on another floor, not to mention the return trip to the employees desk on the original floor. Company's secrets can also be compromised or lost during this process. But until now private elevators for each of such companies, individuals or residences have been either impossible to construct, too impractical, too inflexible, or extremely costly.

SUMMARY

The present invention involves an elevator system which allows building owners, operators or developers to construct many fewer hoistways and operate many more elevator cabs in each hoistway. It also permits any individual or company which leases or owns two or more adjoining floors in a tall building, to operate one or more private elevator cabs between all of such individual's or company's adjoining floors in the same private vertical section of a hoistway. With this invention, a plurality of elevator cabs can operate in different vertical sections of the same hoistway in a tall building. The top cab in a hoistway may be designed in the same manner as currently designed elevator cabs with one counterweight cable connected to the center of the cab's roof, because with this invention there are no other elevator cabs moving above the top cab which would conflict with its center connected counterweight cable. However, the counterweights, counterweight cables and other related equipment of all elevator cabs below the top cab are located outside of the common hoistway path so as not to interfere with the motions of any other cabs or their cables moving through the hoistway. Therefore, each counterweight, counterweight cable and other cables are connected to its associated elevator cab at points horizontally and/or vertically shifted from all other cables. With this invention, up to twenty or more elevator cabs can operate independently of each other in different vertical sections of the same hoistway.

In a preferred embodiment, each elevator cab is connected to four counterweights by cables and their associated pulleys, which are horizontally, vertically, and/or symmetrically separated from each other. Each elevator cab has a separate lift motor and a separate lift cable or cables attached to it, and each lift motor cable and its associated pulleys are horizontally and/or vertically separated from all other cables and other equipment. All data and electric power cables connected to each cab and their associated pulleys are also be horizontally and/or vertically separated from other cables and other equipment. All associated counterweights and counterweight channels of the elevator system are likewise horizontally and/or vertically separated from each other and from all other equipment. A central computer control system determines and controls the motions, destinations, and functions of the cabs in the system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 12 is an illustration of the side view of a one hundred twenty story building which contains a plurality of elevator cabs, each capable of moving independently in different vertical sections of four different hoistways, according to one embodiment of the present invention.

DETAILED DESCRIPTION OF THE INVENTION

Embodiments of the present invention are now described with reference to the figures where like reference numbers indicate identical or functionally similar elements. Also, in the figures, the left most digit(s) of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

The language used in the specification has been principally selected for readability and instructional purposes, and may not have been selected to delineate or circumscribe the inventive subject. Accordingly, the disclosure of the present invention is intended to be illustrative, but not limiting, of the scope of the invention, which is set forth in the claims.

Figure 1:
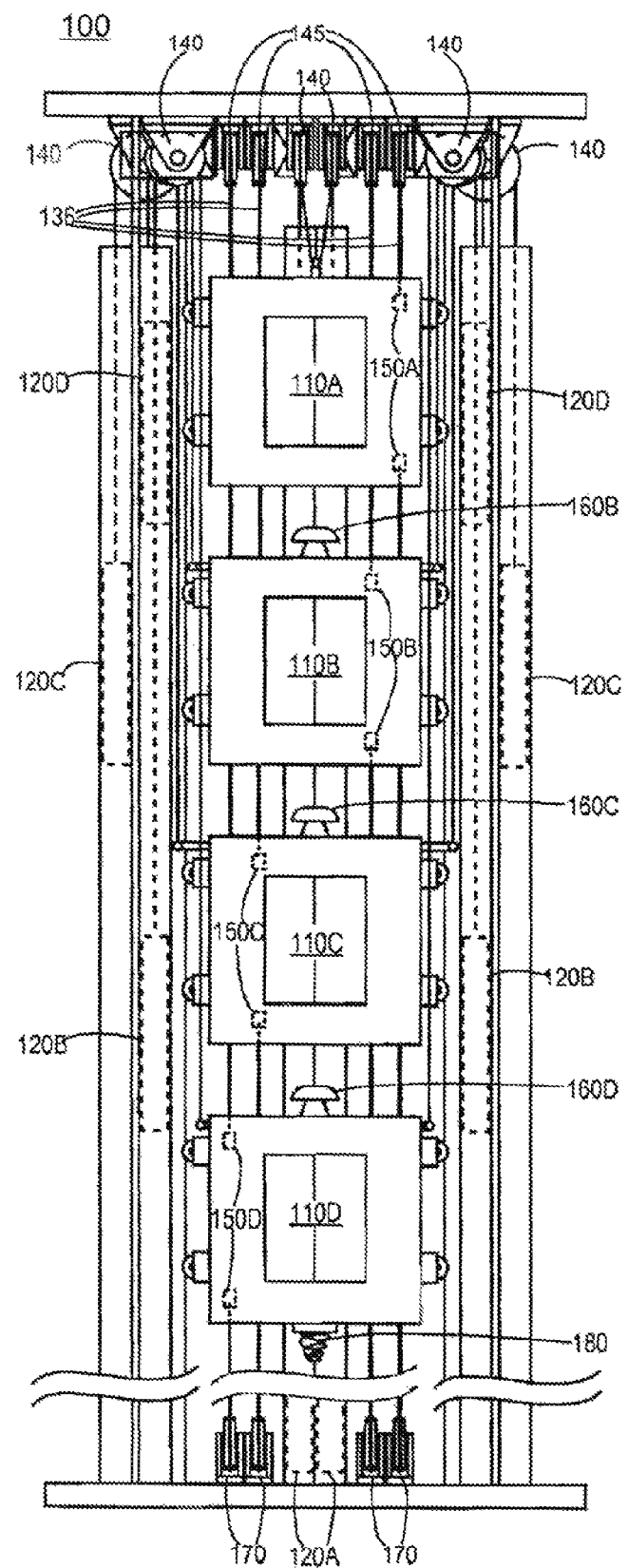
FIG. 1 is an illustration of the front of a hoistway which provides an overview of an elevator system, in accordance with one embodiment of the present invention.

A view from the front of an embodiment of the multi-cab elevator system is illustrated in FIG. 1. A hoistway 100 (hereinafter also referred to as an elevator shaft) is shown containing four cabs 110. It should be recognized that the arrangement of the counterweights 120, the lift motor cables 136, and other elements, allow for the operation of a plurality of cabs in a hoistway 100 in other embodiments of the invention. For example, up to twenty or more elevator cabs can be operated in a single hoistway or elevator shaft. This is made possible by the positioning and the shape of the counterweights, as well as, the horizontal and/or vertical offsetting of the counterweights, their cables, channels, pulleys, lift motors and other elements, as discussed below.

In FIG. 1, the cabs 110 operating in the hoistway 100 are all vertically aligned. From top to bottom, the cabs are referred to as cab 1 (110A), cab 2 (110B), cab 3 (110C) and cab 4 (110D). Each of the cabs 110 is capable of moving throughout the hoistway 100 independently of the others, and without passing another cab, due in part to each cab having a separate and associated lift motor 130 (not shown) and horizontally separated counterweight cables 210, counterweights 120, counterweight pulleys 140, lift cables 136, and lift cable pulleys 145.

The movement of the cabs 110 is driven by separate and dedicated lift motors 130 (not shown) positioned at the top of the hoistway 100, in a preferred embodiment. In alternate embodiments, the lift motors 130 can be placed in different locations, such as at the bottom of the hoistway 100 or each lift motor 130 can be placed at different locations. Each cab 110 is connected to a dedicated lift motor 130 (not shown) by a lift cable 136. Each lift cable 136 is attached to a cab 110 at two vertically aligned lift motor connection points 150 on the cab, e.g., on the rear or side (not shown) of each cab 110. Each cab 110 can also be connected to a lift motor 130 by one or more lift cables 136 attached to one or more connection points 150 on the cab, rather than as illustrated. Two lift cables 136 attached to a cab 110 (not shown) could also be attached to the same lift motor 130, as described below. The lift motor connection points 150 of each cab are horizontally shifted from each other to prevent interference (interaction) between cables 136 of other cabs 110. For example, in FIG. 1, the lift motor connection points 150 shift from right to left as the cabs 110 become lower in the hoistway 100. This allows a plurality of cabs beyond the four illustrated in this embodiment to each be controlled by a dedicated lift motor 130 without any obstruction caused by the lift cables 136. One end of each lift cable 136 connects to the upper lift motor connection point 150 on a cab 110. Each lift cable 136 is then routed around a circular shaft of an associated lift motor 130 (not shown) located near the top of the hoistway 100. Each lift cable 136 can then be routed through a floor lift pulley 170 which can be attached to the bottom of the hoistway 100. Finally, the other end of each lift cable 136 can be attached to the lower of the two lift motor connection points 150.

In an embodiment, the top cab 110A is connected to two counterweights 120A located at the rear of the hoistway 100. In an alternate embodiment, one larger counterweight 120 may be connected to cab 110A. In another embodiment, all counterweights 120 are located on the sides of the cabs 110 that travel through the length of the hoistway 100. Each of the counterweights 120 can be connected to a cab 110 by a counterweight cable 210 (not numbered) running through one of the counterweight pulleys 140 located at the top of the hoistway 100. The counterweight pulleys 140 can be horizontally and/or vertically separated from each other. Different sized pulleys account for different spacing between the cabs 110 and the counterweights 120. Alternatively, multiple pulleys can be used to vary the spacing between the cabs 110 and counterweights 120. The counterweights 120 are all guided through individual counterweight channels 410 in order to control the motion of the counterweights 120 and to avoid interference or collisions between counterweights 120. The counterweights 120 and counterweight channels 410 can be horizontally shifted from each other in order to provide unencumbered access to each of the other elements and avoid interference with other elevator equipment.

The bottom cab, cab 4 110D, can have a spring 180 or another collision dampening device on the bottom of the cab 110D as a safety precaution. In the unlikely event of a collision between the bottom of the hoistway 100 and cab 4 110D, the spring mitigates the damage from impact. All cabs 110 can have a bumper 160 or another collision dampening safety device on the top of the cab. The bumpers 160 are similarly used as a safety precaution to lessen the unlikely impact of a collision between two of the cabs 110.

Figure 2:
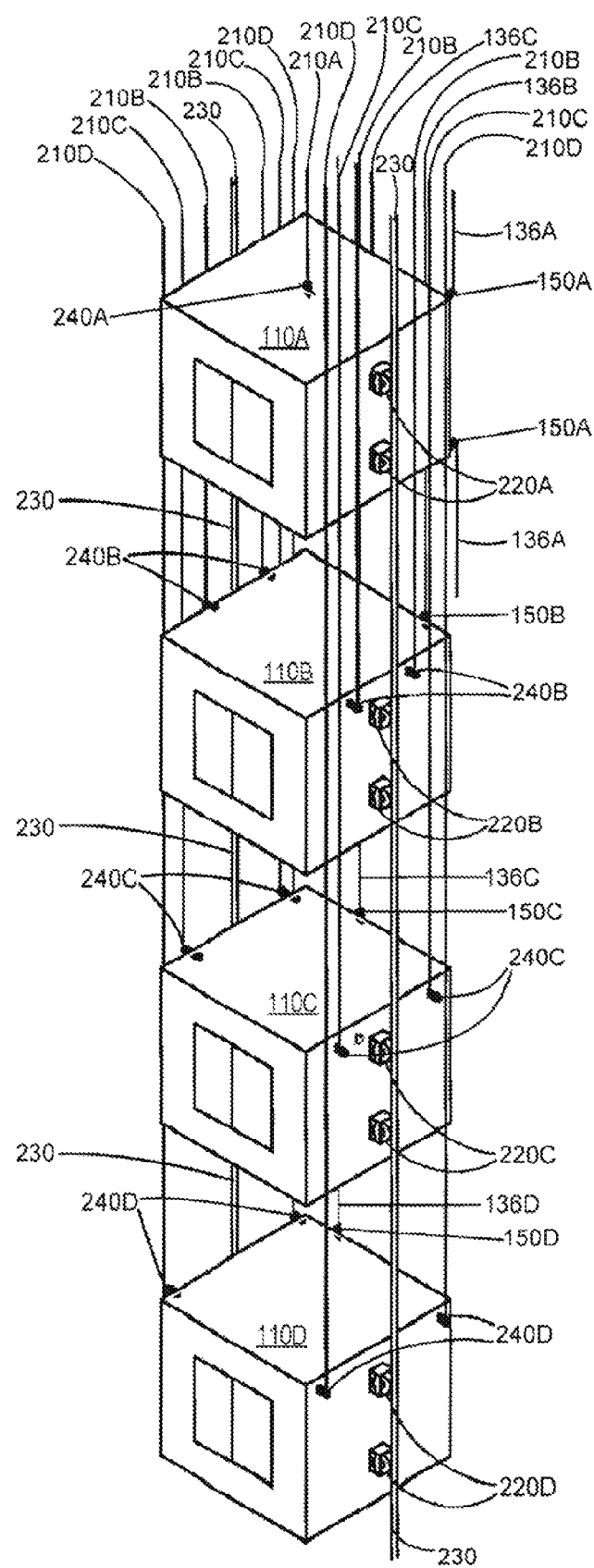
FIG. 2 is an illustration of elevator cabs in a hoistway from another perspective highlighting the connection points of the counterweight cables and the lift cables, and how the guide track elements connect to the cabs, in accordance with one embodiment of the present invention.

FIG. 2 illustrates another perspective of the elevator system, in accordance with one embodiment of the present invention. The cabs 110A, 110B, 110C, 110D, move along two guide tracks 230 on each side of the hoistway 100 that run the length of the hoistway. Each cab 110 is engaged with two opposing guide tracks 230 positioned vertically at the center of the hoistway 100, by utilizing guides or guide apparatuses 220. Guide apparatuses 220 are attached to opposing sides of each cab 110 (some are not shown). While illustrated as wheels, the guides 220 may also include "U"-shaped prongs which can serve as brakes and stabilizers. Different types of guides or guide apparatuses can also be used, some providing guidance and others providing brakes, balance, guidance and stabilization. In a preferred embodiment, each of the depicted cabs 110 has four guides 220, two on opposite exterior sides of each cab and aligned vertically one above the other at the upper center and lower center of each side of each cab 110. Each cab 110 may also have only two guides 220, one on each exterior side of the cab. Various numbers and kinds of guides and guide tracks can be used. Having two opposing vertical guide tracks at the center of each side of a hoistway, rather than one at each corner of a hoistway as in some other systems, provides more balanced weight distribution, and lower maintenance costs in certain situations. The use of two guide tracks also causes less friction between the guides and the guide tracks which results in more efficient operation of the elevator system.

In an embodiment, two of the guides 220 are positioned substantially along a center axis or plane of a first wall of each cab 110 and two guides 220 are positioned substantially along a center axis or plane of a second wall of each cab 110, where in one embodiment the first and second walls of each cab 110 are substantially parallel. The counterweights for cab 110A are connected to the cab at counterweight connection point 240A, which can be located at the center of the roof of cab 110A. In alternate embodiments, cab 110A is connected to a different number of counterweights 120, e.g., four counterweights horizontally separated in a manner similar to the other cabs 110B, 110C, and 110D. In alternate embodiments all cabs 110 have multiple counterweight connection points 240 horizontally separated from each other, for example, similar to those described below.

In one embodiment, the remaining cabs, e.g., cab 110B, cab 110C and cab 110D, can each be connected to four counterweights 120, with two counterweights located on either side of each cab 110 (not shown). The counterweight connection points 240 on the three lower cabs 110 are horizontally shifted in order to avoid interference with one another. Instead of one counterweight connection point 240A at the top center of the top cab 110A, there can be four counterweight connection points 240 located on the top cab 110A, where four counterweight connection points 240 can be positioned symmetrically along upper sides of cab 110A (not shown), similar to the three lower cabs 110. As shown on FIG. 2, the two counterweight connection points 240 located on each side of the lower three cabs 110 can be symmetrically positioned on each side of the guide tracks 230, and can be shifted horizontally from each other so that none of the connection points 240 or their associated counterweight cables 210 will interfere with each other.

Also illustrated in FIG. 2 are lift motor connection points 150A, 150B, 150C, and 150D located respectively at the rear of each cab 110A, 110B, 110C and 110D, and each lift cable connection point 150 is shifted horizontally from each of the other lift cable connection points 150 of each cab. A lift cable 136 can be attached to each lift cable connection point 150 then routed up a side of the hoistway 100 and connected to a lift motor 130 (not shown) in order to provide vertical motion for each cab 110. All lift cables 136 can be horizontally shifted from each other.

Figure 3A:
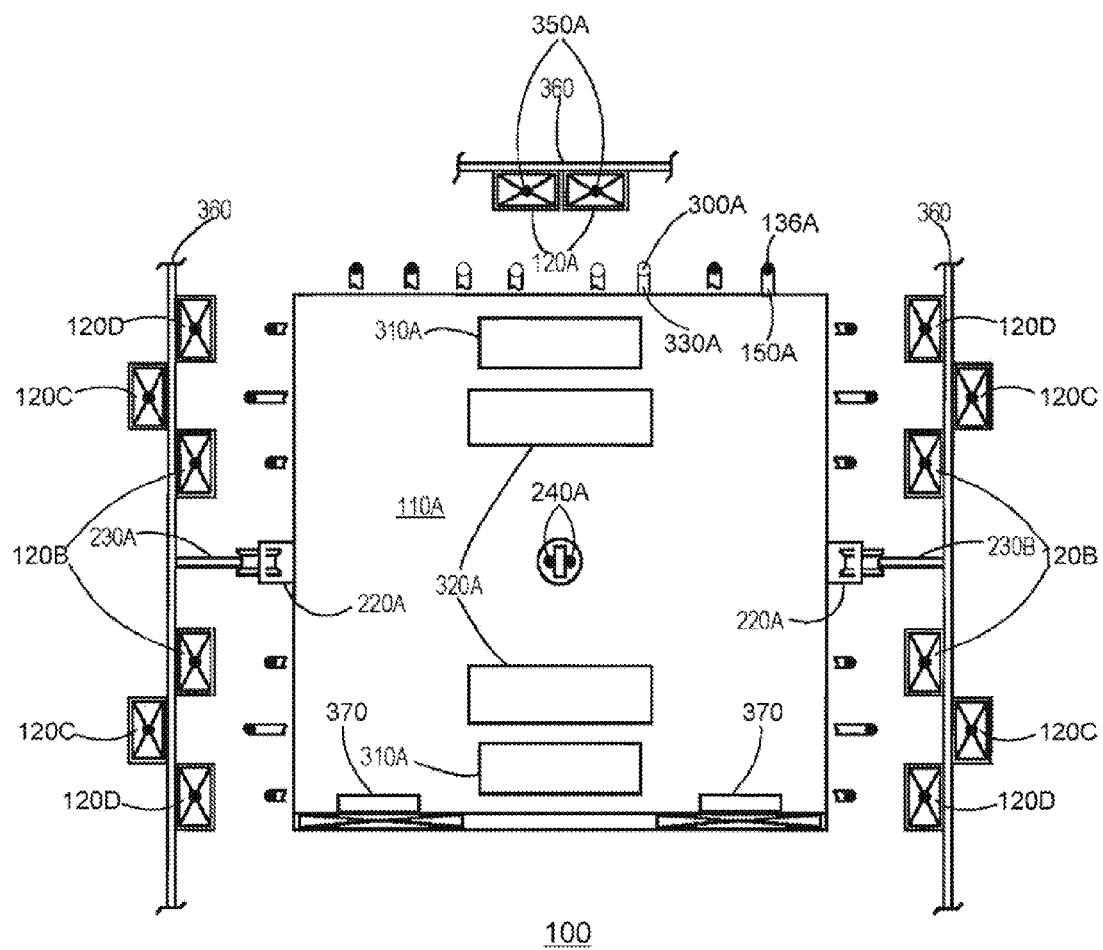
FIGS. 3A to 3D are illustrations of the top view of cabs 1, 2, 3 and 4 that show how each cab is connected to, among other things, the counterweights, the counterweight cables, the vertical guide tracks, the lift cables, and the data and electric power cables, in accordance with one embodiment of the present invention.

FIGS. 3A, 3B, 3C, and 3D illustrate a top view of each of the cabs 110 in one embodiment of the invention. As illustrated in FIG. 3A the location of the counterweights 120A for cab 110A is different than that of the other three cabs, in this embodiment. The counterweight connection points 240A for cab 110A are located at the center of the top of the cab 110A rather than on the sides of the cab. The counterweight connection points 240A are not implemented in this fashion on the other cabs below cab 110A because there is a cab above such other cabs which would interfere with a centrally located counterweight connection point 240. The counterweight connection points 240A at the top center of cab 110A can be connected by two counterweight cables 210A (not shown) to the counterweights 120A located at the rear of the hoistway 100 at two counterweight connection eyes 350A located on the top center of counterweights 120A. As illustrated, the other counterweights 120B, 120C and 120D can be located on interior dividing walls 360 which are located within the hoistway 100. Interior dividing walls 360, located between the hoistway/shaft wall and a cab wall, allow counterweights and other equipment to be located on both sides of the dividing wall 360. This can increase the number of counterweights and cabs that can operate in a single hoistway. Any dividing wall 360 can be extended to span the width of a hoistway 100. Counterweights 120 can also be located on a hoistway wall 800 (not shown) rather than on a dividing wall. However, dividing walls can allow significant flexibility in the selection and placement of counterweights. By utilizing a dividing wall 360, a large number of counterweights can be positioned in a hoistway which can allow more cabs 110 to operate in a hoistway. In some instances, counterweights can be constructed in long and narrow shapes, or other shapes, in order to reduce the horizontal space occupied. Counterweight wells (not shown) can be constructed at the bottom of a hoistway to provide for long counterweights, and therefore permit cabs to have a full range of vertical motion. The counterweights used by the cabs 110 do not need to be of the same size or shape. The most important requirement for all counterweights is that they save energy and keep each cab 110 evenly balanced as it moves through a hoistway. A lift cable 136A for cab 110A is shown at the right rear of cab 110A. It can be connected to a lift cable connection point 150A which is attached to cab 110A. A data and electric power cable 300A for cab 110A, as shown in FIG. 3A, can be located at the right center of the rear of cab 110A. It is connected to a data and power connection point 330A which is attached to cab 110A. As shown on FIG. 3A, all of the connection points 150, 240 and 330 for all of the cabs 110 are horizontally separated from each other, in one embodiment.

Figure 3B:
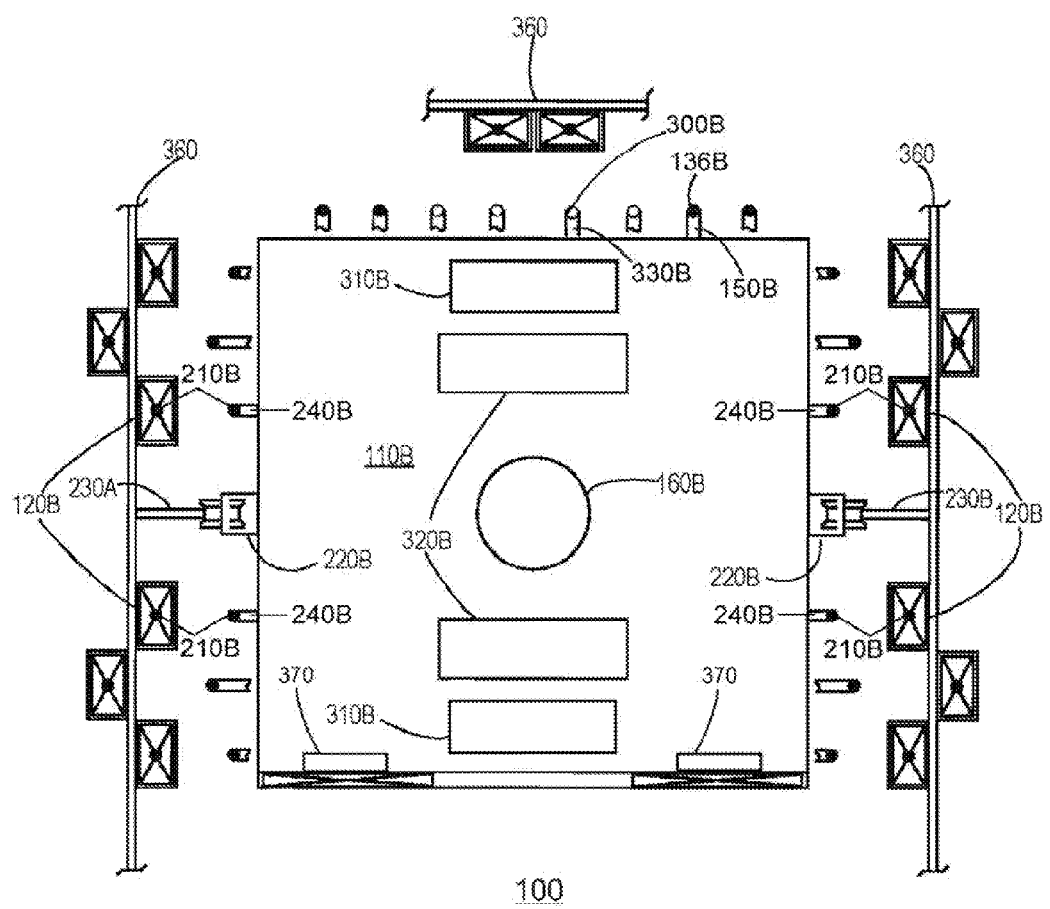
Figure 3C:
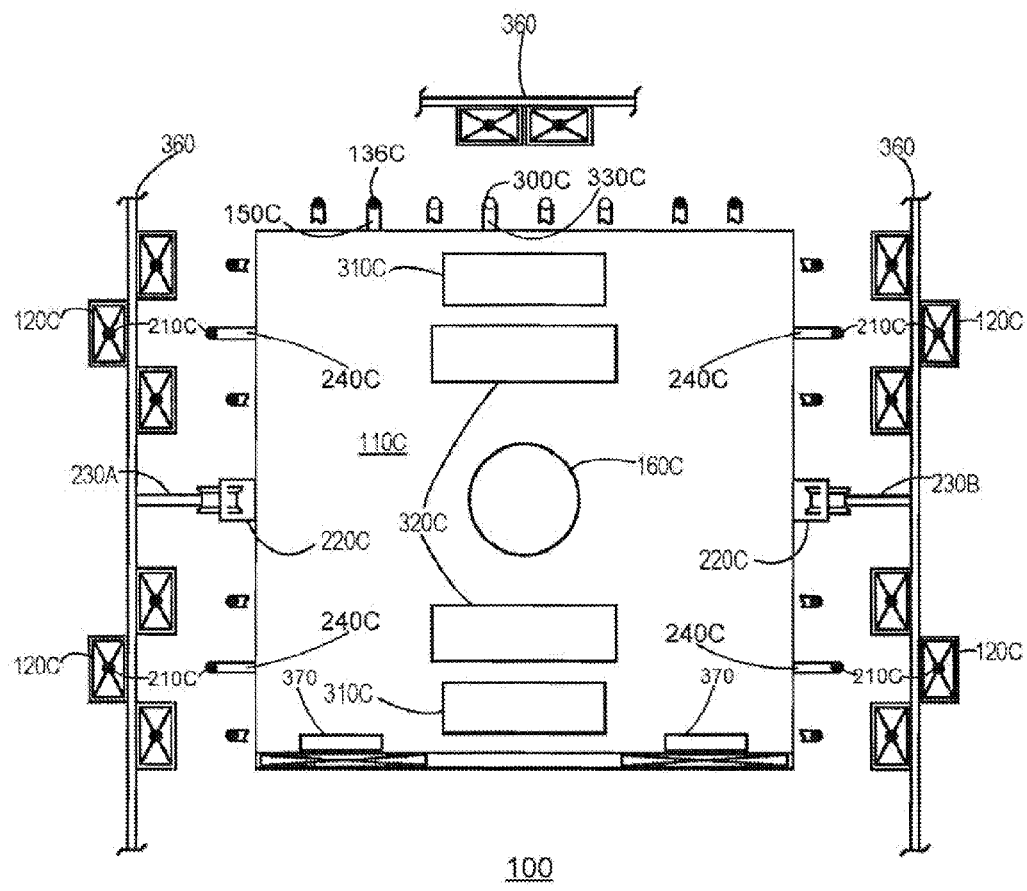
Figure 3D:
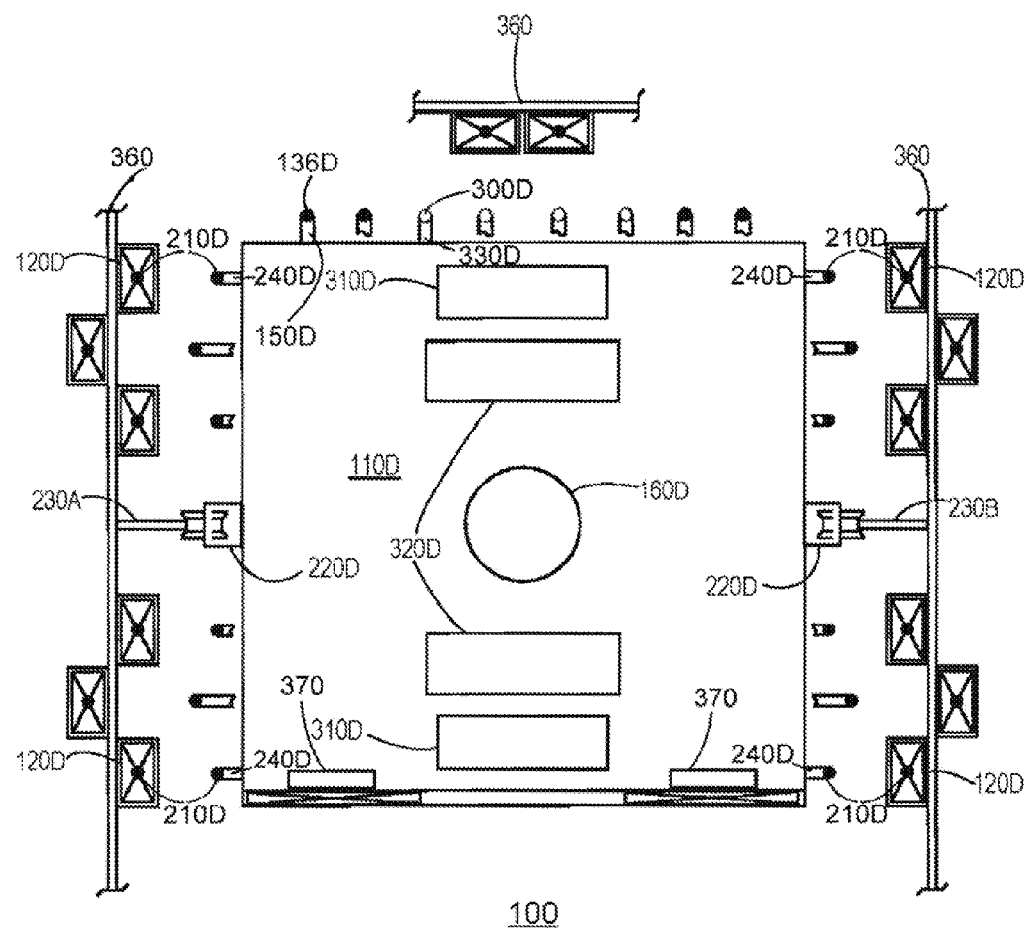

FIGS. 3B, 3C and 3D illustrate a top view of cabs 110B, 110C, and 110D respectively in accordance with one embodiment of the present invention. All of these cabs 110 have horizontally separated counterweight 120 locations. In an embodiment, four counterweights 120 are connected symmetrically to counterweight connection points 240 at the upper sides of each cab 110, such that two counterweights are on each opposing side of each cab 110. In other words, by sectioning the top of the cab into quadrants, when viewed from the top plan view, there is one counterweight 120 and one counterweight cable connection point 240 for each quadrant of each cab 110. This arrangement, with four connection points 240 connected to four counterweights 120, provides balance superior to conventional configurations. In one embodiment, in order to optimize balance, the two counterweight connection points 240 located on each side of each cab 110 are placed symmetrically and equidistant from the guides 220 on that side. As discussed above, the horizontal distance between the counterweight connection points 240 and the guides 220 are different for each cab 110 in order to prevent interference between the various counterweights, cables and pulleys. For example, as illustrated in FIG. 3B, the counterweight connection points 240B for cab 110 can be positioned so that an axis or plane formed between opposite connection points 240 passes through or near to the two-dimensional center of the top of cab 110. In other words, an imaginary axis or plane between counterweight connection point 240B in the rear left quadrant of cab 110B and counterweight connection point 240B in the front right quadrant of cab 110B passes at or near to the two-dimensional center of the top of cab 110B (e.g., near the center of bumper 160B in the two-dimensional perspective of FIG. 3B). Similarly an imaginary axis between counterweight connection point 240B in the rear right quadrant of cab 110B and counterweight connection point 240B in the front left quadrant of cab 110B passes at or near to the center of the top of cab 110B. This assists in balancing and stabilizing the cabs 110 and reducing the torque on the guides 220. The positioning and placement of the counterweight connection points for cabs 110B, 110C and 110D are similar to those of cab 110B.

Similarly, the lift motor connection point 150 and the lift cable 136 on the rear of each of the cabs 110 are horizontally shifted from each other on each cab 110 in the hoistway 100 to prevent interference between the lift motor connection points 150 and lift cables 136 of each cab 110. Alternatively, these lift motor connection points 150 could be located on one or the other sides of the cab, and as close to the central guides 220 as possible for purposes of balancing the cab 110 as it moves vertically through the hoistway 100.

In one embodiment, as illustrated in FIG. 3B, four counterweight connection points 240B can be symmetrically located equidistant and nearest to the guide tracks 230 and the guides 220B on each side of the hoistway 100. The four counterweight connection points 240B can be aligned with and connected to four counterweight cables 210B and each of such cables can be routed up and over a counterweight cable pulley 140B (not shown) and then can be connected to its associated counterweight 120B. A lift cable 136B attached to a lift connection point 150B on the rear of cab 110B can connect to a lift motor 130B (not shown) to enable vertical movement of the cab. The lift motor connection point 150B can be horizontally shifted from all other lift motor connection points 150 of other cabs to avoid interference with other cables. A data and electric power cable 300B can be attached to a data and electric power connection point 330B on the rear of cab 110B and then can connect to its associated data and electric power source located within the hoistway 100 (not shown). Two guides 220B can be attached to each side of the cab 110B (the guides for the lower cabs 110 are directly below those shown) and can be aligned with the opposing vertical guide tracks 230, and they guide cab 110B as it moves vertically along the length of the hoistway 100.

In one embodiment, as illustrated in FIG. 3C, four counterweight connection points 240C can be symmetrically located equidistant to the guide tracks 230 and the guides 220C on each side of the hoistway 100. The four counterweight connection points 240C can be aligned with and connected to four counterweight cables 210C and each of such cables can be routed up and over a counterweight cable pulley 140C (not shown) and then can be connected to its associated counterweight 120C. A lift cable 136C attached to a lift connection point 150C on the left rear of cab 110C can connect to a lift motor 130C (not shown) to enable vertical movement of the cab. The lift motor connection point 150C can be horizontally shifted from all other lift motor connection points 150 of other cabs to avoid interference with other cables. A data and electric power cable 300C can be attached to a data and electric power connection point 330C on the left center of the rear of cab 110C and it then can connect to its associated data and electric power source located within the hoistway (not shown). Two guides 220C can be attached to each side of cab 110C (the guides for the lower cab 110D are directly below those shown) and can be aligned with the vertical guide tracks 230, and they guide cab 110C as it moves vertically along the length of the hoistway 100.

In one embodiment, as illustrated in FIG. 3D, four counterweight connection points 240D can be symmetrically located equidistant to the guide tracks 230 and the guides 220D on each side of the hoistway 100. The four counterweight connection points 240D can be aligned with and connected to four counterweight cables 210D and each cable can be routed up and over a counterweight cable pulley 140D (not shown) and then can be connected to its associated counterweight 120D. A lift cable 136D can be attached to a lift connection point 150D on the left rear of cab 110D and can connect to a lift motor 130D (not shown) to enable vertical movement of the cab. The lift motor connection point 150D can be horizontally shifted from all other lift motor connection points 150 of other cabs 110 to avoid interference with other cables. A data and electric power cable 300D can be attached to a data and electric power connection point 330D on the left center of the rear of cab 110D and can connect to its associated data and electric power source located within the hoistway 100 (not shown). Two guides 220D can be attached to each side of cab 110D and can be aligned with the vertical guide tracks 230D, and they guide cab 110D as it moves vertically through the length of the hoistway.

Bumpers 160 on cabs 110B, 110C, and 110D are also illustrated in FIGS. 3B, 3C and 3D respectively. As described above, these bumpers can mitigate the impact of any possible collision between two cabs. Electronic and/or optical sensors 310 and chain landings 320 are also shown on the top of all of the cabs 110. The sensors 310 can provide information regarding cab locations in the hoistway 100 and can also provide information about the status of cabs, e.g., movement, direction, power status etc. Chain landings 320 can be used as an additional safety device. In an embodiment of the present invention, horizontally and/or vertically shifted electric power and data cables originate near the vertical midpoint of each hoistway 100 (not shown) in order to minimize the distance to the cabs at any given time, and to prevent interference or storage of such cables. The data cables can provide and receive necessary data and information to and from a central control computer. Each of the cabs 110 can have a cab control panel 370 located on a front interior side of the cab. Wherever a connection point is described in any embodiment of this invention it may take the form of a rod, an eye, or some other connection device, and vice-versa.

Figure 4:
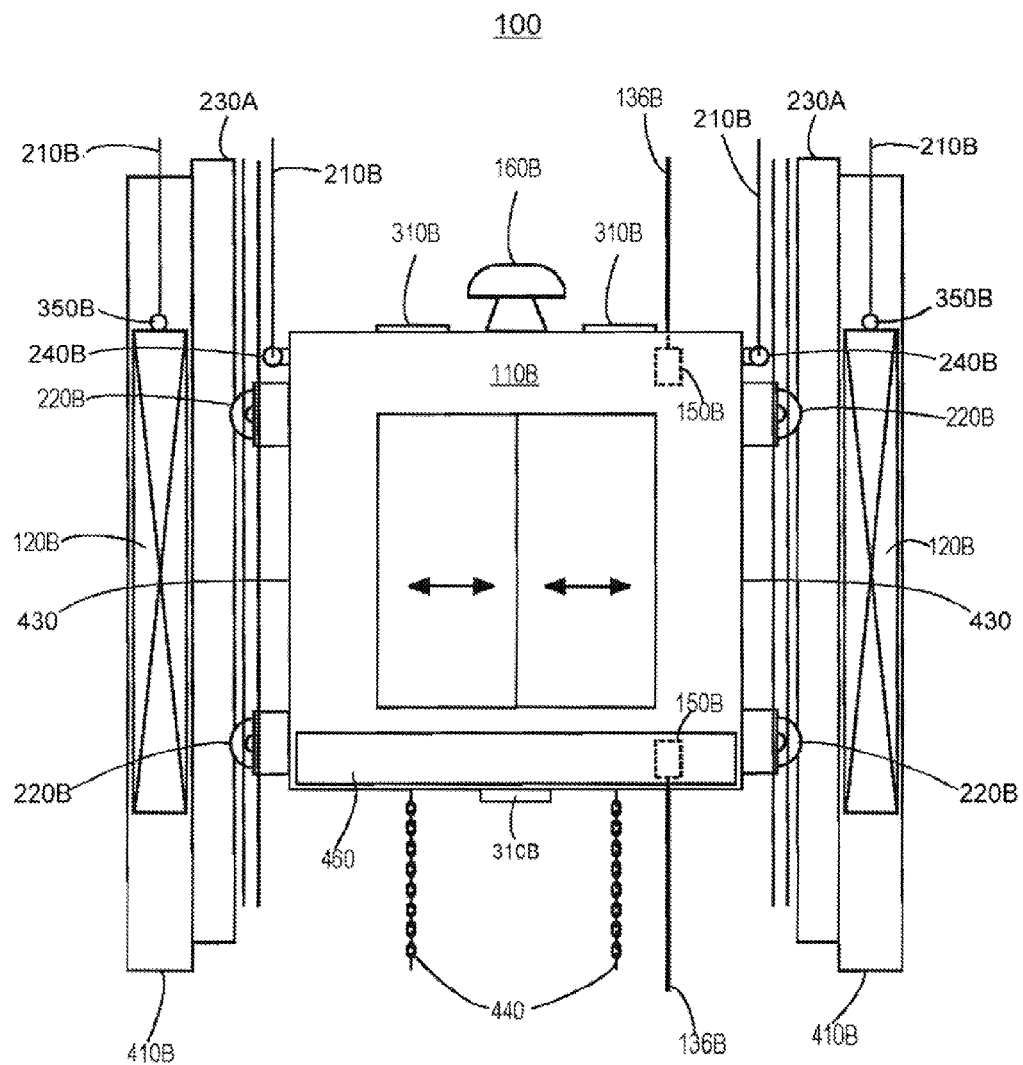
FIG. 4 is an illustration of a front view of cab 2 that shows, among other things, how the counterweights, the counterweight channels, the counterweight cables, the guides and the vertical guide tracks are connected and/or positioned with respect to cab 2, in accordance with one embodiment of the present invention.

FIG. 4 illustrates a perspective from the front of cab 110B. In an embodiment, two guides 220B can be attached to the right side exterior wall 430 of cab 110B, and two guides 220B can be attached to the left side exterior wall 430 of cab 110B. The two front counterweights 120B are shown on either side of cab 110B, and each counterweight 120B can be connected to the cab's counterweight connection points 240B by a counterweight cable 210B. Two additional counterweights connected to cab 110B by counterweight cables 210B can be behind the guide tracks 230, but are not illustrated in FIG. 4. Each of the counterweights 120 in the elevator system can be guided by a counterweight channel 410 which runs the length of the hoistway 100. As shown on FIG. 4, the two front counterweights 120B can be guided in the two counterweight channels 410B located on opposing sides of the hoistway 100. Two other counterweight channels 410B can be located behind those shown, and guide the two rear counterweights 120B (not shown) as the cab 110B moves through the hoistway 100. Each counterweight 120B can be connected to cab 110B by a counterweight cable 210B, which can be attached to a counterweight cable connection point 240B on the cab 110B and to a counterweight cable connection eye 350B or some other connection device positioned on the top of each counterweight 120B. A lift cable 136B can be attached to the rear of the cab 110B by two vertically aligned lift motor connection points 150B. In one embodiment, the control equipment 460 for the cab 110B can be located in the bottom portion of the cab. The control equipment 460 can also be located in the top and side portions of the cab. Among other things, the control equipment governs breaking, opening and closing of doors, leveling of a cab with building floors, and the movement of a cab 110 through a hoistway 100, ensuring that passengers reach their destination without incident. Sensor chains 440 can be attached to the bottom of cab 110B in order to help detect the location of nearby cabs 110 in the hoistway 100. Similarly, electronic and/or optical sensors 310B can be located on the top and bottom of each cab. They can sense obstructions that may be located either above or below the cab 110 and can assist in identifying the location of a cab 110 in the hoistway 100. As previously mentioned, a bumper 160B can be located on top of a cab 110 should a collision occur between cab 110B and another cab from above.

Figure 5:
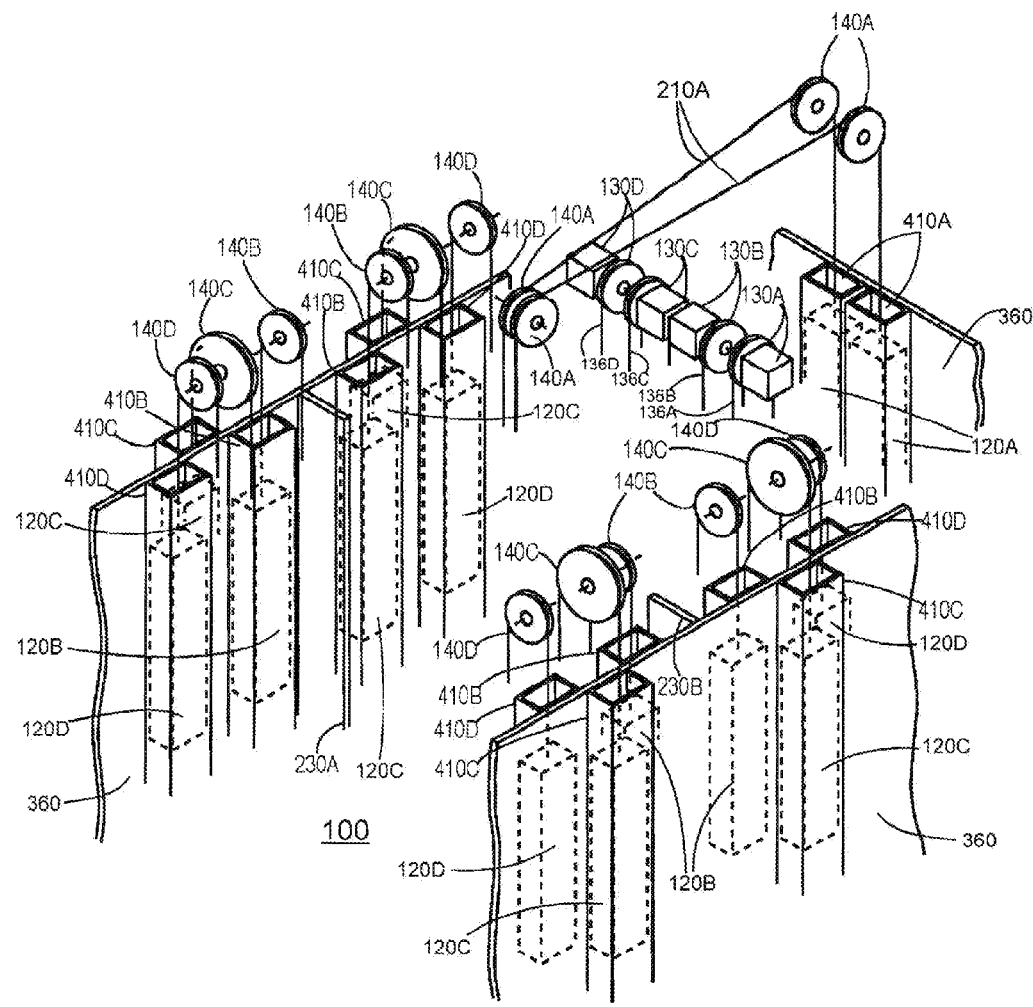
FIG. 5 is an illustration of the top of the elevator hoistway that shows, among other things, the placement of the counterweights in their channels, the counterweight cables, the counterweight pulleys, and the lift motors, in accordance with one embodiment of the present invention.

FIG. 5 illustrates the configuration of counterweights 120 and counterweight channels 410 at the top of a hoistway 100, as well as the associated cables, pulleys and lift motors, in accordance with one embodiment of the invention. For example, in one embodiment counterweight channels 410A and counterweights 120A for cab 110A can be placed along a wall 360 at the rear of the hoistway 100, in contrast to the placement of the other counterweights 120 and counterweight channels 410, in this embodiment. As show in in FIG. 5, counterweights 120A can be connected to cab 110A (not shown) by counterweight cables 210A. Each of the counterweight cables 210A can run through counterweight cable pulleys 140A located above the counterweight channels 410A and through two other counterweight cable pulleys 140A located above the center of cab 110A (not shown). Counterweight channels 410A for cab 110A can be horizontally and/or vertically shifted from four lift motors 130A, 130B, 130C, 130D in order to prevent any interferences and allow unencumbered access to each of these elements. This also preserves space and allows additional motors to be positioned for additional cabs. In an embodiment, lift motor 130A can be connected to cab 110A by lift cable 136A which can be wrapped around circular lift motor shaft 610 (not shown). The other motors 130 are similarly connected to their associated cabs 110. The placement of the counterweights for cab 110A at the rear of the hoistway is due to preference only. In alternate embodiments the position of counterweights 120A and counterweight channels 410A for cab 110A can vary, for example, they can be similar to the orientation set forth below with reference to cabs 110B, 110C and 110D. These alternate embodiments for locations of the counterweights 120 and counterweight channels 410 can also be useful to allow for doors on both the front and rear of the cabs 110.

In another embodiment, as shown in FIG. 5, counterweight channels 410B for cab 110B can be located nearest to and on both sides of the guide tracks 230 on either side of the hoistway 100. In other embodiments, the counterweight channels 410 can be positioned elsewhere, provided that the channels, counterweights, pulleys and related cables associated with each cabs are horizontally and/or vertically shifted and do not interfere with each other. Pulleys 140B can be located above the counterweight channels 410B and route the counterweight cables 210B from the counterweights 120B to their associated counterweight connection points 240B on cab 110B (not shown). Lift motor 130B can be horizontally shifted from the other lift motors 130A, 130C, 130D and can be connected to the rear of cab 110B by lift cable 136B to enable movement of cab 110B.

According to an embodiment, each counterweight channel 410C for cab 110C can be located adjacent to a counterweight channel 410B, on the opposite side of each interior shaft divider wall 360. Pulleys 140C can be located above the counterweight channels 410C and can route the counterweight cables 210C (not numbered) from counterweights 120C to their associated counterweight connection points 240C on the sides of cab 110C (not shown). Lift motor 130C can be horizontally shifted from the other motors 130A, 130B, 130D, and can be connected to the rear of cab 110C by a lift cable 136A (not shown) to enable movement of cab 110C.

Each counterweight channel 410D for cab 110D can be located adjacent to a counterweight channel 410C on a side of each interior shaft divider wall 360 and nearest to the front and rear of the hoistway 100. Pulleys 140D can be located above the counterweight channels 410D and can route the counterweight cables 210D (not numbered) from the counterweights 120D to their associated counterweight connection points 240D on the sides of cab 110D (not shown). Lift motor 130D can be horizontally shifted from the other lift motors 130A, 130B, 130C, and can be connected to the rear of cab 110D by a lift cable 136D (not shown) to enable movement of cab 110D.

Instead of an interior shaft divider wall, all of the counterweight channels can be positioned along elevator shaft walls 800 (not shown).

In an embodiment, the counterweight channels 410 and counterweights 120 for cabs 110B, 110C and 110D can also be stacked back-to-back or side-to-side on the walls of the hoistway 100. This method of positioning counterweights 120 and their associated channels 410 can greatly increase the number of cabs that an elevator system is able to operate in the same hoistway, as will be illustrated in FIG. 10 and FIG. 11. The counterweight pulleys 140 positioned along either side of the hoistway 100 can be horizontally and/or vertically shifted in a manner similar to the counterweights in order to allow for operation of more elevator cabs 110. In an alternate embodiment, the counterweights 120 and counterweight channels 410 can be positioned external to the hoistway 100 (not shown).

Figure 6:
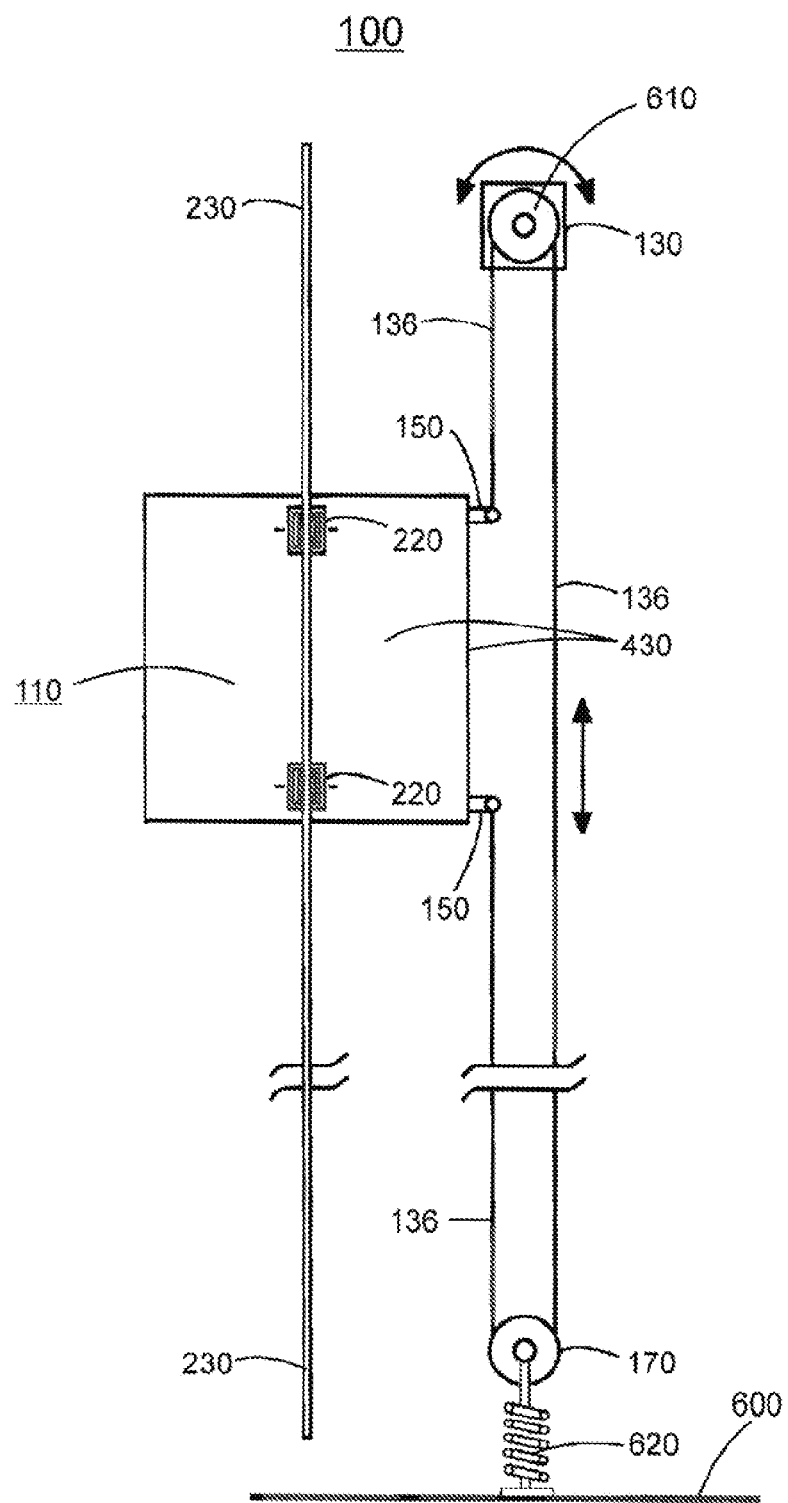
FIG. 6 is an illustration of the placement of the guide tracks and how the lift motor, the lift motor pulley, and the lift cable is connected to each of the cabs, in accordance with one embodiment of the present invention.

FIG. 6 illustrates a side view of a lift motor system which can be used for each cab 110 in accordance with one embodiment. In an embodiment, the lift motor system illustrated in FIG. 6 is similar for all cabs 110 although the particular positioning of the lift cable connection points 150 relative to the lift cables 136 may vary symmetrically, horizontally and/or vertically. In an embodiment, a vertical guide track 230 runs along the vertical center of two opposing sides of a hoistway 100 and each guide track 230 engages with two guides 220 located at the top center and bottom center of two opposing exterior sides 430 of each cab 110. The two guides 220 can be vertically aligned with the two guide tracks 230 and move vertically along the guide track 230 through the hoistway 100. Two lift motor connection points 150 can be positioned on an exterior wall 430 of each cab 110 and can be vertically aligned with each other. One end of a lift cable 136 can be attached to the top lift cable connection point 150. The lift cable 136 can then be routed up the hoistway and around a circular rotating shaft 610 of a lift motor 130, which can be located near the top of the hoistway 100. The lift cable 136 can then be routed down the length of the hoistway 100 and around a floor pulley 170 which can be pulled toward the floor by a traction spring 620 which can be attached to the basement floor 600. The traction spring 620 can provide the required tension and traction to enable a lift motor 130 to pull a cab 110 up and/or down the guide track 230 as the cab is guided and stabilized by the guide apparatuses 220. The lift cable 136 can then be routed back up the hoistway and attached to the bottom lift cable connection point 150 located near the bottom of the cab exterior wall 430. It is also envisioned that one lift cable connection point 150 may serve to connect both ends of a lift cable 136 to each cab 110. Between the lift cable connection points 150, the lift cable 136 can become somewhat circular and continuous Like the elevator counterweight system, this lift motor system can eliminate the need for any cable storage. According to embodiments, counterweight cables and lift motor cables described herein, can be made of carbon fiber, steel or combinations thereof.

While it is feasible in some embodiments for one hoistway to be utilized, e.g., in a deep mine shaft, in a tall tower, or as a private elevator between adjoining floors of a building, two or more hoistways can be utilized in other embodiments for increased passenger occupancy and convenience. With a plurality of hoistways, the central elevator control system can alternate and coordinate the direction which the cabs in each hoistway are traveling, in effect creating a circular traffic pattern of elevator cabs. Proper coordination of the directions that cabs are traveling can minimize the delays that passengers experience. The computer control system can ensure that enough cabs for proper service can be traveling in each one-way direction. Two hoistways with multiple elevator cabs can be expected to be sufficient for many buildings with 40 or more floors. In one embodiment, it is estimated that an additional hoistway can be added for each additional 40 floors that a tall building has.

Figure 7:
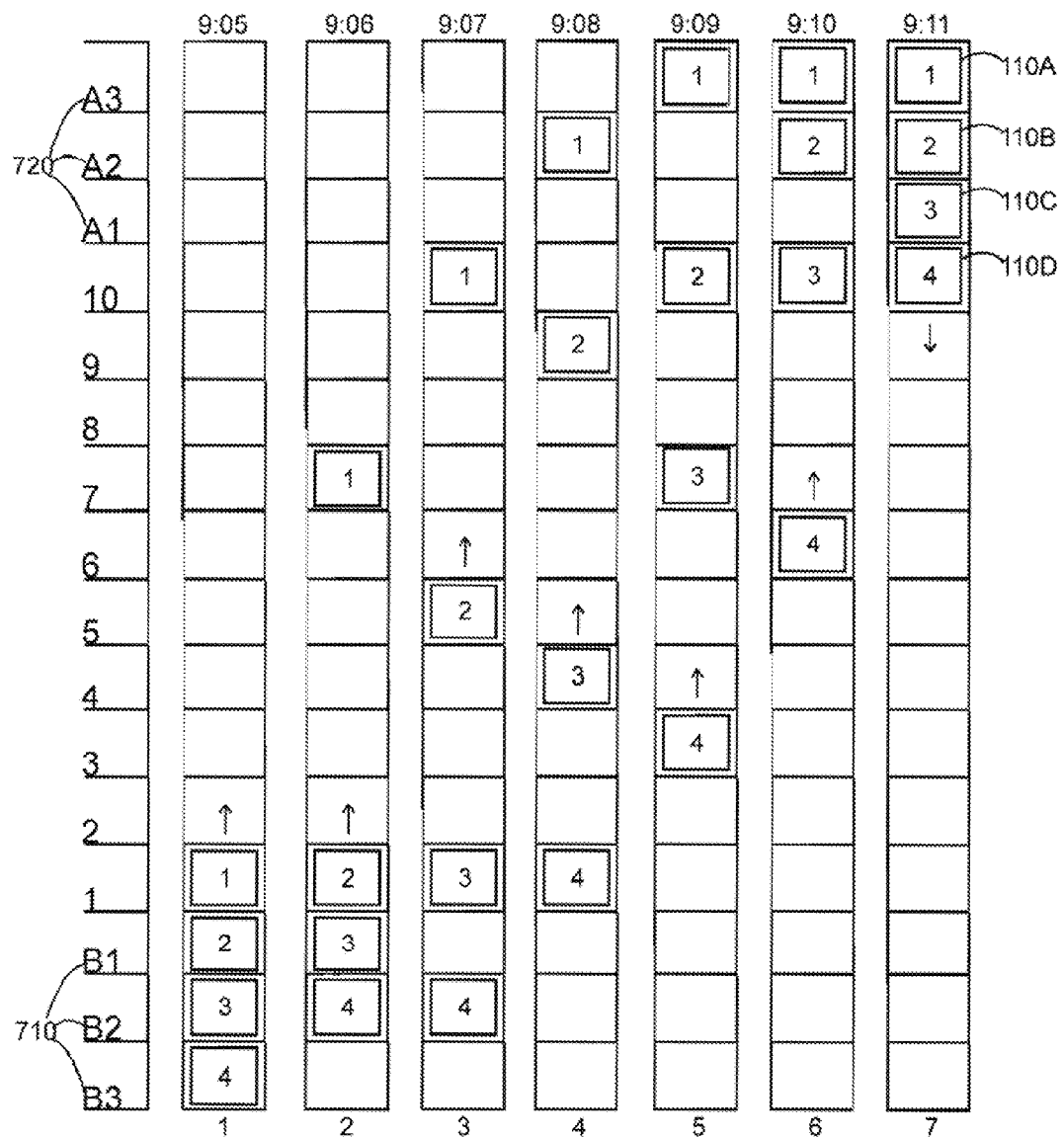
FIG. 7 is an illustration of the operation of an elevator hoistway having multiple elevator cabs moving independently of each other in the same hoistway over a period of time, in accordance with one embodiment of the present invention.

In an embodiment, FIG. 7 illustrates the general operation of a hoistway over time with four cabs, 1, 2, 3, 4, operating in a hoistway. In FIG. 7, a hoistway containing four cabs is shown at 7 different points in time, 9:05 A.M. through 9:11 A.M., in order to demonstrate the operation of the multiple cab hoistway system, according to one embodiment. At 9:05, cab 1 is located at floor 1 with passengers entering cab 1, and the rest of the cabs 2, 3, and 4, are located in basement slots 710. The basement slots 710 may be located on floors used for parking cars and other uses. At 9:06, cab 1 moves up the hoistway to transport passengers to upper floors and the other cabs move up one floor in order to take on passengers and prepare to transport them to upper destinations. At 9:07, cab 2 moves up the hoistway and begins to load and unload passengers at various floors. Then cab 3 moves up to floor 1 to permit passengers to enter the cab. At 9:08 cab 1 has delivered all of its passengers, cabs 2 and 3 are still transporting passengers, and cab 4 has moved up to floor 1 in order to load passengers. By 9:08 cab 1 has moved to the attic slots 720 in order to allow the other cabs to service any of the upper floors in the hoistway. People transferring from parked cars on basement floors 710 should use cabs 2, 3 and 4 to arrive at their desired upper destinations.

By 9:09, cab 1 has moved up to attic slot A3 in order to make room for cab 2 and cab 3 in the other attic slots. Cab 2 is unloading passengers on floor 10 and cab 3 is still servicing floors 7 through 10. Cab 4 is still servicing passengers on floor 3. By 9:10, the lower cabs 3 and 4 continue to travel upwards while transporting passengers, and eventually they will dock at the highest floor possible. By 9:11 all of the cabs have moved up and docked at the highest possible slots in the hoistway. At this point, a similar process is begun in the opposite direction. All four cabs progressively move down the hoistway loading and unloading passengers until all of the lowest hoistway floors are again filled with docked elevator cabs. At this point in time the above described process begins all over again.

Attic slots 720 and basement slots 710 are constructed and used to enable all cabs to service all of the occupied floors in a building (in this case, floors 1-10). If attic hoistway slots A1 to A3 were not available, only cab 1 would be able to service floor 10. Cab 1 would not be able to move out of the way and allow the other cabs to reach floor 10. A similar problem would occur if there were no basement hoistway slots, B1 to B3. The hoistway can still operate if attic and basement slots are not included, but certain cabs would not be able to provide service to certain floors.

An advantage of this invention is that in addition to future buildings, many existing buildings can effectively and inexpensively be retrofitted for compatibility with the present invention. In an embodiment, the elements of this invention can be contained within an existing hoistway. In an embodiment, this elevator system does not need to store cables due to the arrangement of cables, pulleys, counterweights and lift motors. In an embodiment, some of the cables, pulleys, lift motors and other equipment can be located outside of a common hoistway, including above, below, or to the sides of a hoistway. In an embodiment, by utilizing multiple cabs in a single hoistway, a building can achieve additional elevator and passenger capacity while eliminating one or more hoistways and elevator lobbies and converting those hoistways and lobbies to revenue producing space on each floor. The space used for elevator support or equipment throughout a building can also be reduced by eliminating one or more hoistways.

Modifications can be made to the present invention in order to allow opposing doors to be used on each end of the cabs 110. For example, while not illustrated, all of the counterweights, channels, cables, pulleys, and related equipment which would impede access to a rear cab door can be moved to the edges of the rear and/or front of a hoistway, or to the sides of a hoistway, or positioned on either side of a dividing wall 360 or a shaft wall 800 (not shown). While useful for future buildings, the present invention is also compatible with existing buildings, existing hoistways, and existing elevator systems.

Attic and basement hoistway slots can also be used to store cabs and suspend operation of certain cabs. This can help to reduce operating costs during low usage periods such as nights, weekends and holidays in an office building. The computer control system can also select a cab to service only a certain subset of floors, which can help with high traffic periods in some tall buildings, with conventions occurring on certain floors, or with a certain number of floors that are dedicated to one company with an abnormally high number of employees. Instead of use by passengers, elevator cabs of the current invention can also be adapted for use by automobiles (i.e. a vertical garage) or merchandise and materials on moveable pallets (i.e. a vertical warehouse).

The above text and figures describe various embodiments with respect to a tall building. It is also envisioned that alternate embodiments of the present invention can be utilized by a deep mine (underground), a tall thin tower, or integrated with horizontal movement systems.

Figure 8:
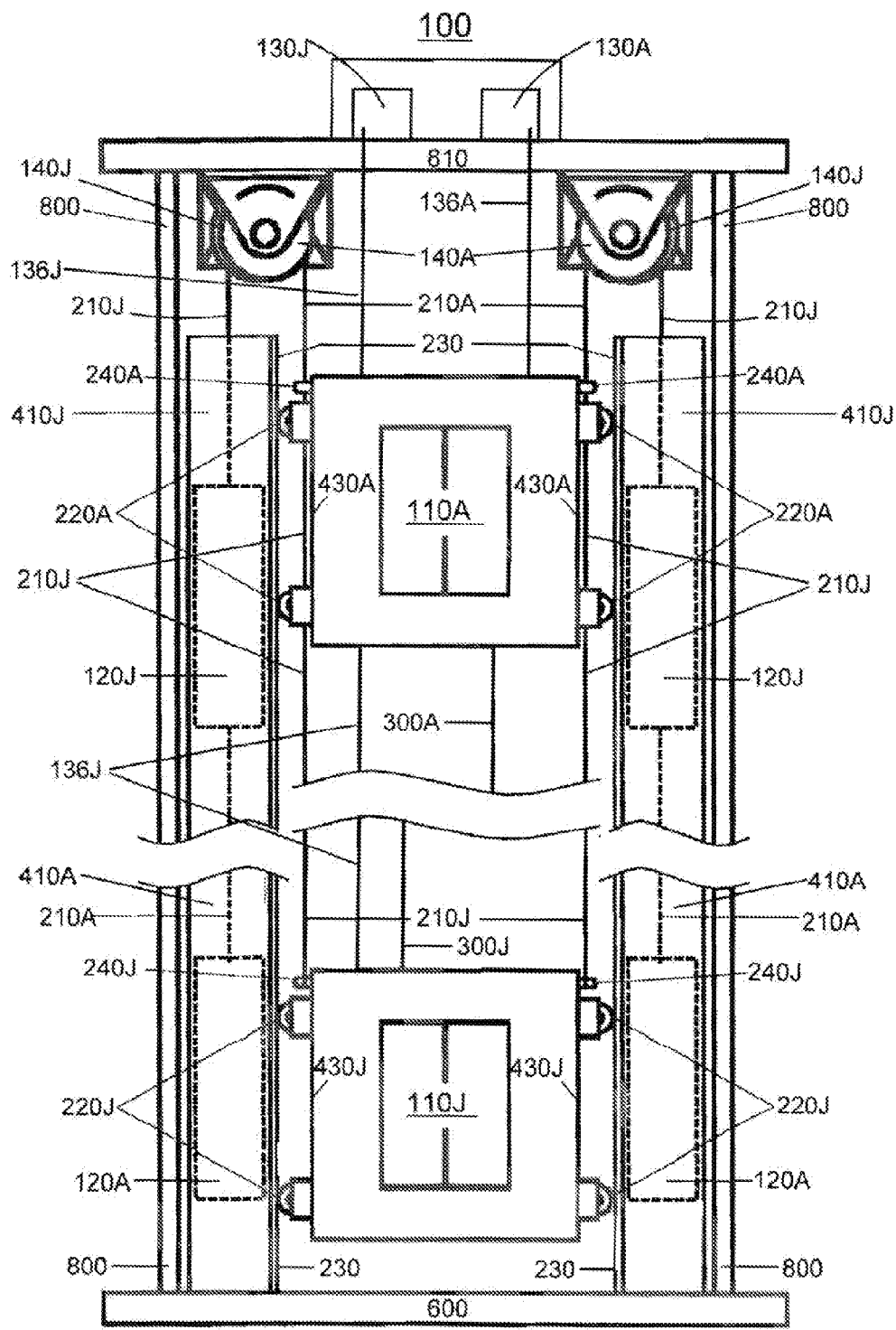
FIG. 8 is an illustration of the front of the top section and the front of the bottom section of a hoistway which shows, among other things, two independently moving elevator cabs out of a plurality of possible elevator cabs moving in the same hoistway, according to one embodiment of the present invention.

FIG. 8 illustrates an embodiment of a multi-cab elevator system having a plurality of possible elevator cabs 110 moving independently of each other in the same hoistway 100. For example, ten cabs 110 (110A, 110B, 110C, 110D, 110E, 110F, 110G, 110H, 110I, 110J) can move independently of each other in the same hoistway 100 (see FIG. 10). In one embodiment, as illustrated in FIG. 8, the top cab 110A, and the bottom cab 110J, can be respectively located in the top section and in the bottom section of a hoistway 100. All of the cabs 110 in hoistway 100 can be vertically aligned and move independently from one another without passing one another.

Figure 10:
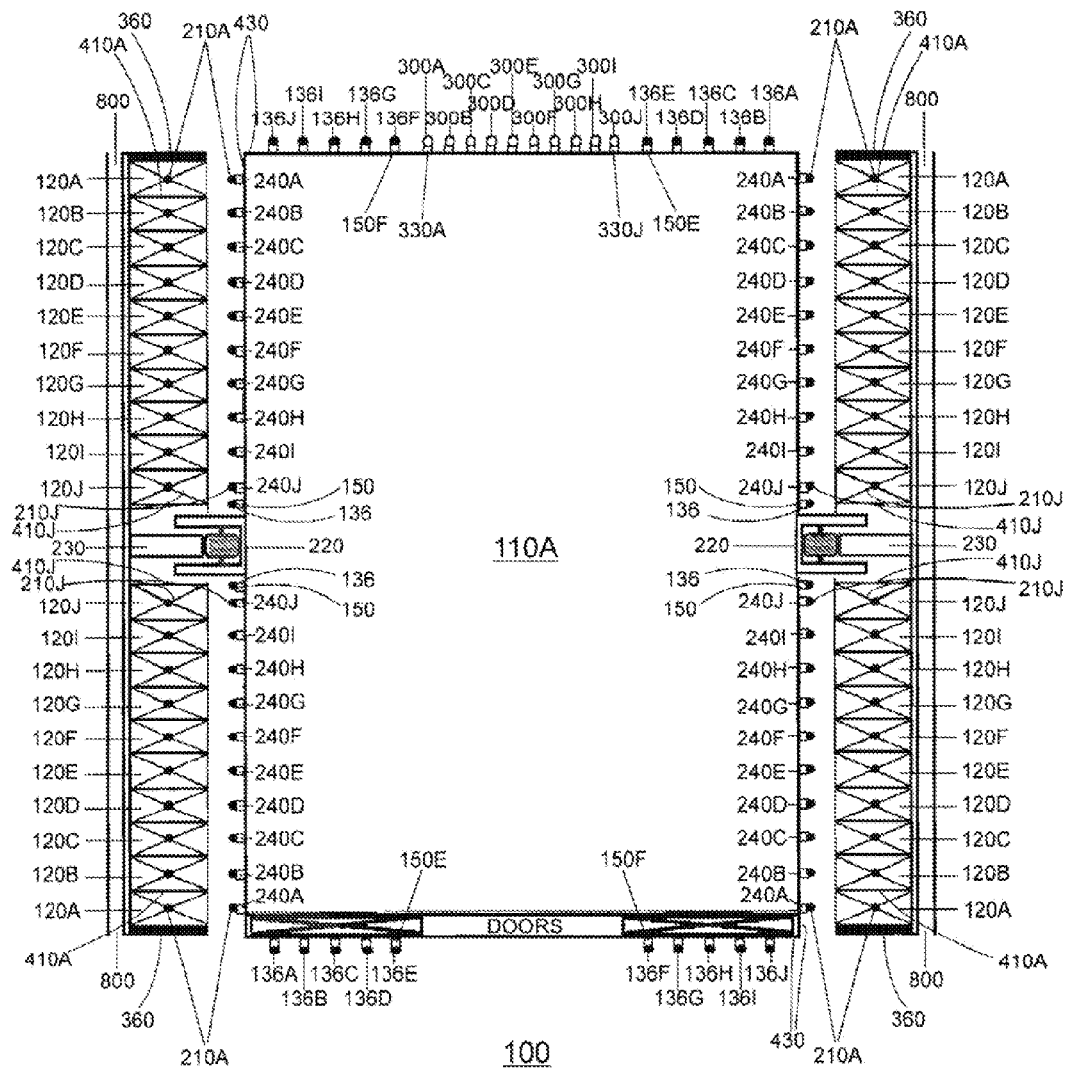
FIG. 10 is an illustration of the top view of the top elevator cab and its associated elements in a hoistway that contains a total of ten elevator cabs and their associated elements, wherein each cab is capable of moving independently in different vertical sections of the same hoistway, according to one embodiment of the present invention.

In an embodiment, as illustrated in FIG. 8, the topmost cab 110A, can be connected to four counterweights 120A which can be located near to the bottom of the hoistway 100 (the other two counterweights 120A can be behind those shown), utilizing four counterweight cables 210A (the other two cables 210A are behind those shown). Each of the four counterweights 120A can be guided within a separate counterweight channel 410A, one counterweight 120A guided within one counterweight channel 410A. Each counterweight cable 210A can be attached to a counterweight connection point 240A (the other two counterweight connection points 240A can be behind those shown) located along the top of each exterior side 430A of cab 110A, as illustrated in FIG. 10. Each counterweight cable 210A can be routed up and over a counterweight pulley 140A (the other pulleys 140A can be positioned behind those shown), and then down each counterweight channel 410A. Each of the counterweight cables 210A can then be attached to the top of each associated counterweight 120A (the other counterweights 120B to 120I can be located vertically between counterweights 120A and 120J, and are not shown). Cab 110A can have at least one dedicated lift motor 130A which can be located on an attic floor 810 of the building. In another embodiment, the lift motor 130A can be located on the basement floor 600, or elsewhere. A lift cable 136A can be connected between the lift motor 130A and the lift cable connection points 150A located on the rear of cab 110A (points 150A are not shown). Cab 110A can be guided along two opposing vertical guide tracks 230 attached to the center of each opposing hoistway wall 800. Guide apparatuses 220A can be attached to the center of each exterior side wall 430A of cab 110A, one at the top center of cab 110A and the other at the bottom center of cab 110A, as illustrated in FIG. 8.

In an embodiment, as illustrated in FIG. 8, the bottommost cab 110J, can be connected to four counterweights 120J which can be located near the top of the hoistway 100 (the other two counterweights 120J can be behind those shown), utilizing four counterweight cables 210J (the other two cables 210J can be behind those shown). Each of the four counterweights 120J can be guided within a separate counterweight channel 410J, one counterweight 120J guided within one counterweight channel 410J. Each counterweight cable 210J can be attached to a counterweight connection point 240J (the other two points 240J can be behind those shown) located along the top of each exterior side 430J of cab 110J, as illustrated in FIG. 10. Each counterweight cable 210J can be routed up and over a counterweight pulley 140J (the other pulleys 140J can be behind those shown), and then down each counterweight channel 410J. Each of the counterweight cables 210J can then be attached to the top of each associated counterweight 120J (the other counterweights 120B through 120I can be located vertically between counterweights 120A and 120J, and are not shown). Cab 110J can have at least one dedicated lift motor 130J which can be located on an attic floor 810 of the building. In another embodiment, the lift motor 130J can be located on the basement floor 600, or elsewhere. A lift cable 136J can be connected between the lift motor 130J and the lift connection points 150J located on the rear of cab 110J (points 150J are not shown). Cab 110J can be guided along two opposing vertical guide tracks 230 attached to the center of each opposing hoistway wall 800. Guide apparatuses 220J can be attached to the center of each exterior side wall 430J of cab 110J, one at the top center of cab 110J and the other at the bottom center of cab 110J, as illustrated in FIG. 8.

In an embodiment, cabs 110B through 110I can be located vertically in alphabetical order between cab 110A and cab 110J, but are not shown in FIG. 8. The primary differences between any of such cabs 110A through 110J is the different horizontal position of their associated counterweights (120A to 120J), of their associated counterweight channels (410A to 410J), of their associated counterweight cable connection points (240A to 240J), of their associated counterweight cables (210A to 210J), of their associated lift cables (136A to 136J), of their associated lift cable connection points 150A to 150J (not shown), of their associated data and electric power cables 300A to 300J (not shown), of their associated data and electric power connection points 330A to 330 (not shown), and of the pulleys 140 associated with cabs 110A through 110J, as shown in FIG. 8.

It should be recognized that the configuration of the counterweights, channels, connection points, cables, pulleys and motor systems permit less than ten cabs 110 or more than ten cabs 110 (i.e. 20 cabs, see FIG. 11) to move independently in the same hoistway 100.

Figure 9A:
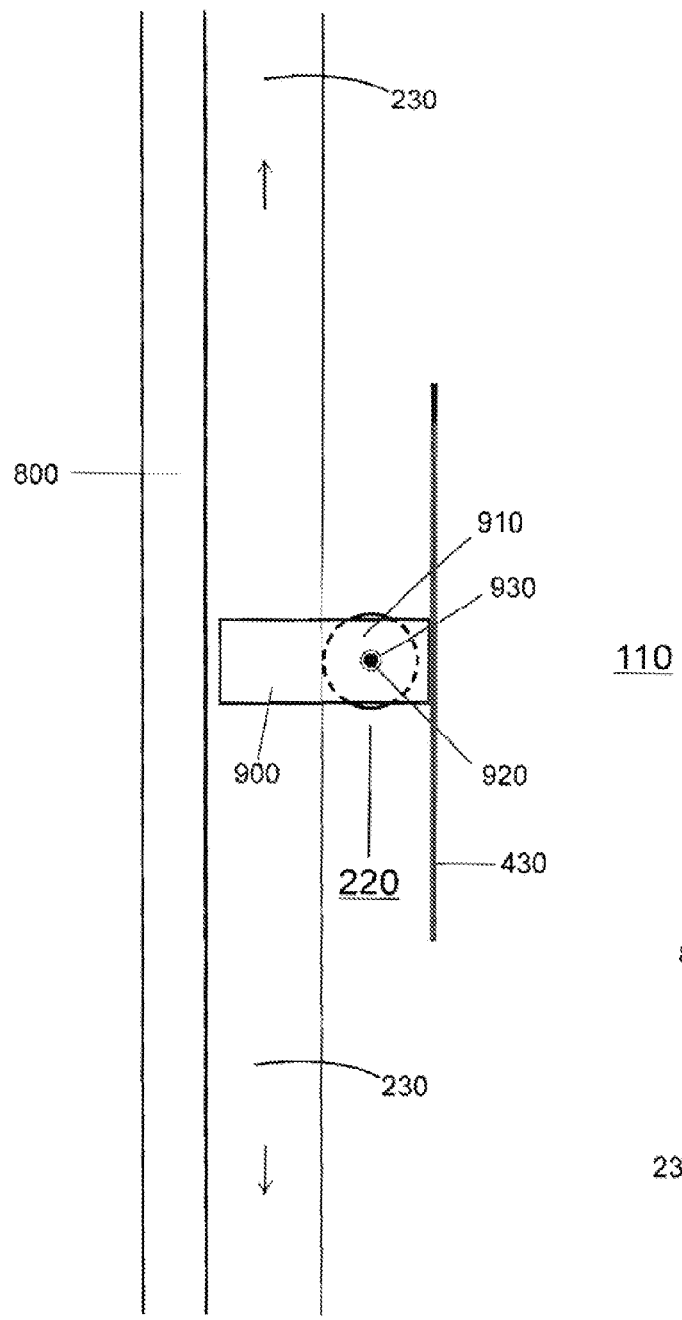
FIG. 9A is an illustration of the side view of a guide apparatus that guides an elevator cab along a vertical guide track, according to one embodiment of the present invention.
Figure 9B:
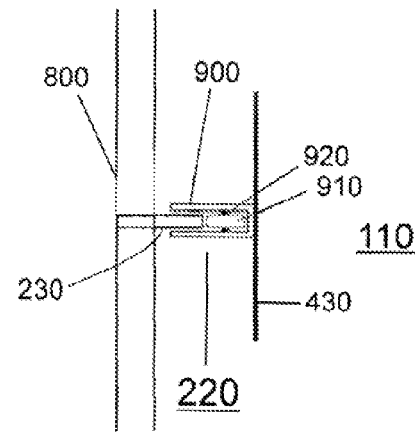
FIG. 9B is an illustration of the top view of a guide apparatus that guides an elevator cab along a vertical guide track, according to one embodiment of the present invention.

In an embodiment, as illustrated in FIG. 9A and FIG. 9B, the guide apparatus 220 may comprise a "U" shaped prong 900, an axle 920, a wheel 910 and two washers 930. The steel prong 900 can be shaped somewhat like a musician's tuning fork. The axle 920 can be positioned into two aligned and opposing holes on the prong, and each hole can be positioned on an opposing arm of the prong 900. The axle 920 may be welded to the prong 900 for purposes of stabilization. In an embodiment, the axle 920 can be positioned through the center of the wheel 910, and the two washers 930 can be positioned around the axle 920, one on each side of the wheel 910. All of such elements may be made of substances other than steel as long as they are sufficiently strong and rigid. A vertical guide track 230 mounted along the center of an elevator hoistway wall 800 can be positioned between each arm of the prong 900 of the guide apparatus 220 so that they engage each other. The guide track 230 can remain in firm contact with each wheel 910. In an embodiment, a guide apparatus 220 can be positioned at the top center and at the bottom center of each exterior side 430 of each cab 110 (not shown). As cab 110 moves up and down the hoistway 100 each guide apparatus 220 can guide the cab 110 along the guide track 230, and the wheel 910 can rotate around the axle 920, keeping the cab 110 firmly against the guide track 230 in a straight line path.

FIG. 10 illustrates how the counterweights (120A to 120J) for each of the ten elevator cabs (110A to 110J) operating within the hoistway 100 can be aligned, positioned and connected to their associated cabs (110A to 110J) and can be positioned relative to each other, to each cab's associated counterweight channels (410A to 410J), to each cab's associated counterweight cable connection points (240A to 240J), to each cab's associated counterweight cables (210A to 210J), to the vertical guide tracks 230, to each cab's guide apparatuses 220 (the other guides 220B to 220J can be behind those shown), to each cab's associated lift cable connection points 150A to 150J (some are not numbered), to each cab's lift cables 136A to 136J, to each cab's associated data and electric power connection points 330A to 330J, and to each cab's data and electric power cables 300A to 300J (some are not numbered), according to one embodiment of the present invention.

According to an embodiment, each cab 110A to 110J can be connected to four associated counterweights 120A to 120J by means of four associated counterweight cables 210A to 210J (some are not numbered), each connected to an associated quadrant of each cab 110. Each counterweight (120A to 120J) can move in a vertical path within its associated counterweight channel (410A to 410J) through the hoistway 100, which path can be aligned with each counterweight's associated counterweight cable connection point (240A to 240J). Each connection point 240 can be horizontally and symmetrically positioned in each quadrant of each cab 110. One end of each counterweight cable (210A to 210J) can be attached to each cab (110A to 110J) at an associated counterweight cable connection point (240A to 240J) which can be positioned horizontally and symmetrically along the top of the exterior side wall 430 of each quadrant of each cab (110A to 110J). The other end of each counterweight cable (210A to 210J) can be routed over an associated counterweight cable pulley 140A to 140J (not shown) and then can be attached to an associated counterweight connection eye 350A to 350J (not shown) located at a top center of each associated counterweight (120A to 120J). Some of the counterweight cables 210 are not separately identified. Each counterweight (120A to 120J) can be guided through a separate and associated counterweight channel (410A to 410J) horizontally and symmetrically positioned adjacent to each quadrant of each cab 110 in order to control the movement of each counterweight 120 through the hoistway 100 and to avoid interaction or interference between other cabs, other counterweights, and other cables.

For example, the topmost cab 110A can be connected to four associated counterweights 120A by four counterweight cables 210A. Each of the four counterweights 120A for cab 110A can be symmetrically positioned in a quadrant of a cab 110A and can be positioned nearest to each corner of cab 110A which helps to balance cab 110A as it moves through a hoistway 100. Each counterweight 120A can be guided within its associated counterweight channel 410A (some channels 410 are not separately numbered) and can connect to cab 110A by four counterweight cables 210A (some cables 210 are not separately numbered) at four associated counterweight connection points 240A. As illustrated in FIG. 10, each counterweight connection point 240A can be horizontally shifted from each other, and from the other connection points (240B to 240J) of other cabs (cabs 110B to 110J) to avoid any interference with the points 240.

For another example, the bottommost cab 110J can be connected to four counterweights 120J by four associated counterweight cables 210J. Each of the four counterweights 120J for cab 110J can be symmetrically located in a quadrant of cab 110J and can be positioned nearest to each guide track 230 on each side of a hoistway 100. This helps to balance cab 110J as it moves through a hoistway 100. Each counterweight 120J can be guided within its associated counterweight channel 410J and can connect to cab 110J by four associated counterweight cables 210J at four associated counterweight connection points 240J. As illustrated in FIG. 10, each counterweight connection point 240J can be horizontally shifted from each other, and from the other connection points (240A to 240I) of other cabs (cabs 110A to 110I) to avoid any interference with the points.

The embodiments of the other eight cabs (110B to 110I) can be substantially the same as those of cab 110A and cab 110J just described, except that the positions of their counterweights (120B to 120I), of their counterweight connection points (240B to 240I), of their related counterweight cables (210B to 420I), of their counterweight channels (410B to 410I), and of their associated pulleys (not shown), can be at positions which are horizontally and/or vertically shifted from all of the others, as shown in FIG. 10.

Each lift motor 130 (not shown) for cabs 110A to 110J can have at least one lift cable 136. Each lift cable (136A to 136J) can be attached to an associated lift cable connection point 150A to 150J (some are not numbered). As illustrated in FIG. 10, each lift cable 136 can be attached to a lift cable connection point 150 which is positioned as close as possible to a guide apparatus 220 for purposes of balance and stability. Each lift cable 136 positioned in this manner can be horizontally and/or vertically shifted from each other in order to avoid any interference between the cables.

In an alternate embodiment, as also illustrated in FIG. 10, each cab (110A through 110J), instead of having just one lift motor cable 136, may instead have two or more lift motor cables 136 positioned symmetrically along the exterior of the rear and front of each cab 110A through 110J. For example, two lift cables 136A can be connected and positioned symmetrically on opposite corners of cab 110A and function together with lift motor 130A (not shown) to simultaneously lift cab 110A. Similarly, two or more lift cables 136J can be connected and positioned symmetrically on different opposite corners of cab 110J and function together with lift motor 130J (not shown) to simultaneously lift cab 110J. Similar configurations of two lift cables (136B to 136I) can apply to cabs 110B through 110I. As shown on FIG. 10, all lift cables 136A through 136J can be horizontally shifted from one another and can be attached to associated lift cable connection points 150A to 150J (some are not numbered).

In an embodiment of the invention, as illustrated in FIG. 10, ten data and electric power cables (300A through 300J) can be positioned symmetrically along the center of the exterior rear wall 430 of each cab 110. Each such cable (300A to 300J) can be connected to an associated data and electric power connection point 330A to 330J (some points 330 are not numbered), and each point 330 can be shifted horizontally from each other point 330 in order to avoid any interference between the points. In another embodiment, the data and electric cables 300 and points 330 may be located elsewhere on each cab 110.

There can be two or more electronic and/or optical sensors 310 (not shown) positioned on the top of each cab (110A through 110J), and there also can be two or more electronic and/or optical sensors positioned on the bottom of each cab (not shown). Cab control panels 370 (not shown) may be located on the interior of the front walls of each cab (110A through 110J). Whenever the term 'eye' is used herein it can also take the form of a rod or a point. Whenever the term 'position' is used herein it can also mean 'location,' and vice-versa.

Figure 11:
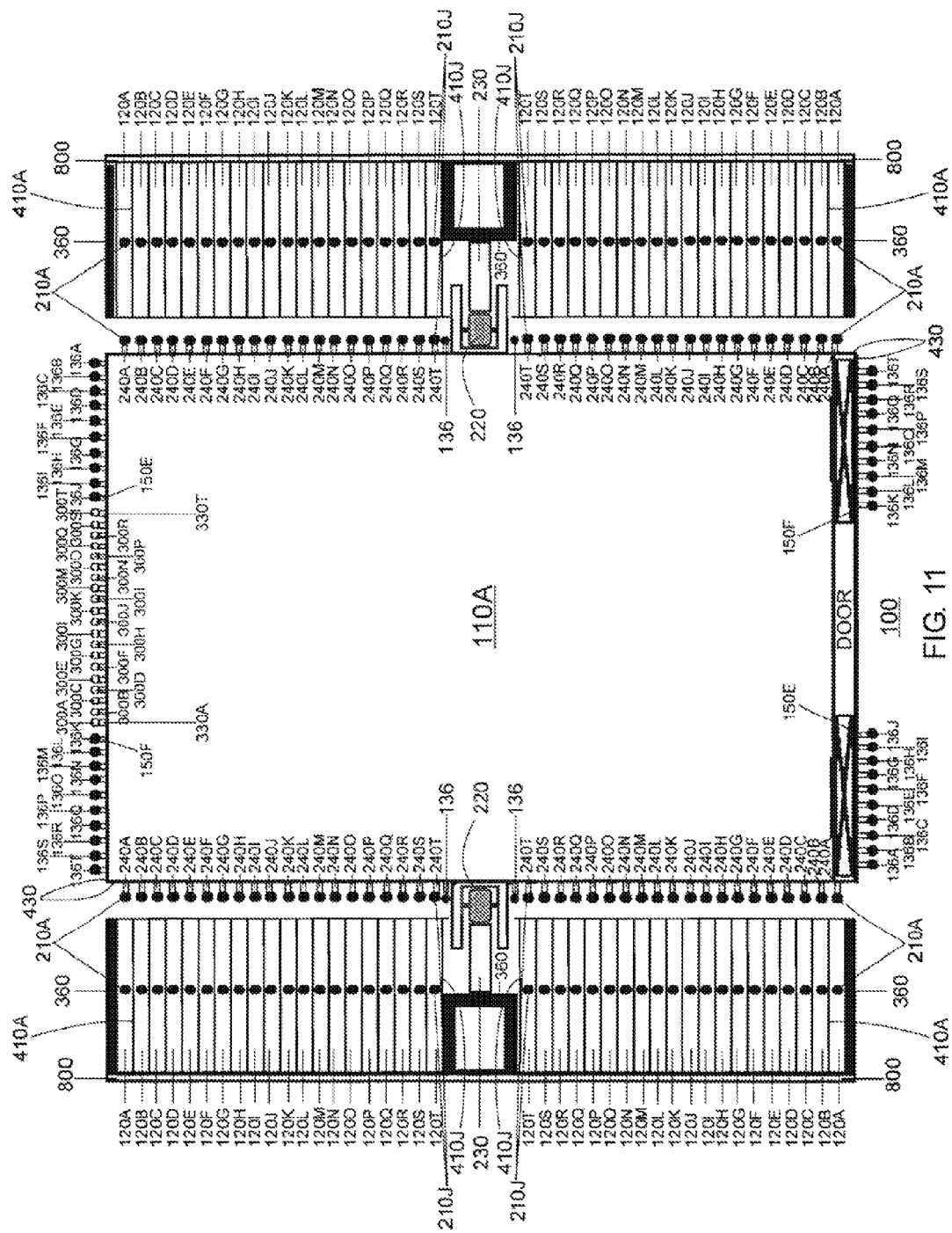
FIG. 11 is an illustration of the top view of the top elevator cab and its associated elements in a hoistway that contains a total of twenty elevator cabs, and their associated elements, wherein each cab is capable of moving independently in different vertical sections of the same hoistway, according to one embodiment of the present invention.

FIG. 11 is a top plan view illustrating the configuration of counterweights, counterweight channels and connection points for twenty (or more) elevator cabs (110A to 110T) which can move independently of one another in a hoistway 100. In this embodiment, each cab can have four associated counterweights (120A to 120T), four associated counterweight cable channels (410A to 410T), four associated counterweight cables (210A to 210T), one or two lift motor cables (136A to 136T), one data and electric power cable (300A to 300T) and associated connection points and pulleys. Each element can be horizontally and/or vertically shifted from all of the other counterweights, counterweight cables, channels, connection points, pulleys, lift cables, data and electric power cables of the other cabs 110 within a hoistway 100 in order to avoid interference among them. FIG. 11 is conceptually very similar to FIG. 10, and it illustrates the top of elevator cab 110A in a hoistway 100 that contains twenty elevator cabs (110A to 110T), nineteen of which are not shown because they are directly below the top cab 110A. FIG. 11 also illustrates how four counterweights (120A to 120T) for each of the twenty cabs within the hoistway 100 can be connected by counterweight cables (210A to 210T) to their associated connection points (240A to 240T) positioned on an associated elevator cab (110A to 110T), and how all of the elements can be positioned relative to other counterweights (120B to 120T), other counterweight channels (410B to 410T), other counterweight cables (210B to 210T), opposing vertical guide tracks 230, other guide apparatuses (220B to 220T) which can be positioned directly below those shown, other lift cables (136B to 136T), other associated lift motor connection points (150B to 150T) (some of which are not specifically identified), other data and electric power cables (300B to 300T), other associated data/electric power connection points (330B to 330T) (some of which are not specifically identified), according to an embodiment of the present invention.

In this embodiment, the placements and connections of the counterweights (120A to 120T), of the counterweight cables (210A to 210T), of the counterweight channels (410A to 410T), of the counterweight cable connection points (240A to 240T), and their associated pulleys which relate to each cab in a twenty cab hoistway can be symmetrically positioned and horizontally and/or vertically shifted in similar fashion to the configuration, connection and motions of these elements in the ten elevator cab hoistway embodiment as discussed above. Because the positioning and operation of the lift cables (136A to 136T) and the data and electric power cables (300A to 300T), and their associated connection points and pulleys can also be substantially similar to the ten cab embodiment as described in FIG. 10 above, they will not be described again here.

In a twenty cab elevator system embodiment, as illustrated in FIG. 11, there are twice as many lift cables (136A to 136T), data and electric power cables (300A to 300T), associated lift motors (130A to 130T), associated lift motor pulleys (145A to 145T), associated lift motor connection points (150A to 150T), and twice as many of all other elements as described above, which are necessary for twenty cabs as compared to the ten cab embodiment illustrated in FIG. 10. In FIG. 11, each counterweight channel (410A to 410T) and each counterweight (120A to 120T) can be twice as long and one-half as wide as those shown in the ten cab elevator system of FIG. 10. Differences in size and shape of counterweights 120 and their channels 410 are necessary in order to physically accommodate twice as many counterweights 120 and counterweight channels 410 alongside each cab (110A to 110T) in FIG. 11.

In other embodiments, more or less than ten or twenty cabs 110 and their associated elements may be similarly configured as in FIG. 10 and FIG. 11 in order to operate independently in a multi-cab elevator hoistway 100.

FIG. 12 is an illustration of a 120-floor office building which contains four different hoistways, each containing a plurality of elevator cabs, and each cab can move independently of the others in different vertical sections of the same hoistway, according to one embodiment of the present invention. In this embodiment, the 120-floor office building is occupied by six large companies (Company A, B, C, D, E and F), and each company occupies about 20 vertically adjoining floors. In this building, there are four different elevator shafts (S1, S2, S3, S4) that service various floors. FIG. 12 shows how multiple elevator cabs in each shaft move up and down over different periods of time, according to one embodiment.

In an embodiment of Shaft S1, there are four elevator cabs (1, 2, 3, 4) which can access all floors in the building, including all three attic (equipment & storage) floors and all three basement (parking) floors. Shaft S1, in FIG. 12, illustrates three scenarios for cabs 1-4 by showing all four elevator cabs (1, 2, 3, 4) docked in the lowest four floors and waiting to ascend; all four elevator cabs (1, 2, 3, 4) docked in the highest four floors and waiting to descend; and all four elevator cabs (1, 2, 3, 4) moving independently of each other and going up or down between the other floors in the building. All of these cabs (1, 2, 3, 4) moving in either direction (up or down) always stop at floor 1 (the street floor) to allow passengers to enter or exit. (See FIG. 7 for more details concerning this embodiment.)

In an embodiment of Shaft S2, as shown in FIG. 12, there can be ten elevator cabs (numbered 1 through 10) that move independently of each other through vertical sections of Shaft S2. Because there are only three docking slots at each end of this hoistway, passengers in some cabs will have to transfer to a cab in another hoistway in order to complete a journey from some of the topmost floors to some of the bottommost floors, and vice-versa. Also because of the above limitation, according to an embodiment of the present invention, each of these cabs can only be permitted by the central elevator computer control system to access about 70% of the floors in each direction of Shaft S2.

As illustrated in FIG. 12, cabs 1, 2, 3, 4 can move upward in Shaft S2 from lower floors of the building toward the top of the building and said four cabs (1, 2, 3, 4) can dock in the four topmost floors of the building (floors A3, A2, A1 and 120), awaiting their next downward journey. Cabs 5, 6, 7, 8, 9, and 10 can respectively end their upward journeys at floors 90, 80, 70, 60, 50, 40. Passengers in any of the latter six cabs who wish to continue their upward journey to a higher floor can be advised by the building's elevator computer control system to exit their cabs at certain floors and to take a specified cab in Shaft S1 or Shaft S3 to continue their journey to their higher desired destination floor. For example, passengers in cab 7 can be advised to exit cab 7 on floor 70 and to take cab 12, 13, 14 or 15 to floor 120.

At this point in time all cabs (1 through 10) in Shaft S2 can begin their descent down Shaft S2 toward the designated floors where they can stop. Cabs 7, 8, 9, 10 can proceed to service floors toward the bottommost four floors (B3, B2, B1, and 1) where they can dock and await their next upward journey. Cabs 1, 2, 3, 4, 5, 6 Can move downward servicing floors and can respectively end their downward journey at floors 80, 70, 60, 50, 40, and 30 (as is similarly illustrated by cabs 11 through 16 which are shown in Shaft S3). Passengers in any of the latter six cabs who wish to continue their downward journey to floors 1, B1, B2 or B3 or other lower floors can be advised by the building's elevator computer control system to exit their cabs at certain floors and to take a specified cab in Shaft S1 or Shaft S3 to continue their journey to their lower desired destination floor. For example, passengers in cab 4 can be advised to exit cab 4 at floor 50 and to take cab 17, 18 or 19 to floor 1. At this point in time the above process can begin to repeat itself in Shaft S2.

Meanwhile, in another embodiment, there can also be ten elevator cabs (numbered 11 through 0) in Shaft S3 that can move independently of each other through vertical sections of Shaft S3. Because there are also only three docking slots at each end of this hoistway in this embodiment, passengers in some cabs will also have to transfer to a cab in another hoistway in order to complete a journey from some of the topmost floors to some of the bottommost floors, and vice-versa. In an embodiment, each of these cabs is also only permitted by the central computer control system to access about 70% of the floors in each direction of Shaft S3. As illustrated in FIG. 12, cabs 17, 18, 19, 20 can move downward in Shaft S3 to the bottom of the building and can now dock in the four bottommost floors (1, B1, B2 and B3), awaiting their next upward journey. Cabs 11, 12, 13, 14, 15 and 16 can respectively end their downward journey at floors 80, 70, 60, 50, 40, 30. Passengers in any of the latter six cabs who wish to continue their downward journey to a lower floor can be advised by the building's central elevator computer control system to exit their cabs at certain floors and to take a specified cab in Shaft S1 or Shaft S2 to continue their journey to their lower desired destination floor. For example, passengers in cab 14 can be advised to exit cab 14 at floor 50 and to take cab 9, 8 or 7 to floor 1. At this point in time all cabs in Shaft S3 can begin their assent up Shaft S3 to the designated floors where they can stop (as is similarly illustrated in Shaft S2), and the above process can begin to repeat itself in Shaft S3. The cabs in Shaft S2 and Shaft S3 can operate in conjunction with each other to service as many floors and passengers as possible in the shortest possible time periods.

Because these embodiments are so efficient and contain so many elevator cabs, only two elevator shafts each containing ten cabs may be sufficient to service the entire 120 floors of a building. Similarly, two elevator shafts which each contain twenty elevator cabs and operate in similar fashion to S2 and S3, may be sufficient to service a building with over 240 floors.

In an embodiment of the present invention operated in a 160-floor building, for example, the elevator system may utilize 15 or more elevator cabs to operate at the same time in the same elevator shaft. In an embodiment for a 200-floor building, for example, the elevator system may utilize 20 cabs to operate at the same time in an elevator shaft. In either of these embodiments, an elevator system described in FIG. 8 through FIG. 11 may be utilized.

Because up to twenty or more elevator cabs can operate independently in the same elevator shaft, only two elevator shafts may be necessary in order to service any tall building, no matter how many floors there are in the building being serviced. For example, in one embodiment, a three hundred floor building may be adequately serviced by an elevator system comprising forty elevator cabs operating in two hoistways of a building. Thus, this sharing of hoistways by multiple elevator cabs can result in a great saving of cost, energy, materials, and building space, and a great increase in cab passenger capacity in any given elevator shaft in any building.

Shaft S4, as shown in FIG. 12, illustrates an embodiment of the present invention in a hoistway which is dedicated to private elevators for each of the six companies (Company A through Company F) in a building, wherein each company leases or owns about twenty adjoining floors in a 120-floor building. The adjoining floors for each company coincide with each company's private section of the hoistway and can be herein referred to as each company's private section of a hoistway. In an embodiment, each company may choose to have one or two private elevator cabs operate in its private section of the hoistway S4. If company A chooses to have just one private elevator cab that will service all twenty of its private floors (e.g. floor 101 to floor 120), then such cab (shown as A1 in Shaft 4) can access all of A company's floors between floor 101 and floor 120. In this embodiment, elevator cab collisions cannot occur in the Company A's private section of Shaft S4. Storage slots are also unnecessary when just one elevator cab is utilized. However, the wait time for just one private elevator cab, and the limited number of passengers that can be serviced by just one cab, may become problems for Company A.

In an alternate embodiment, Company C may choose to have two private elevator cabs operating in its private section of Shaft S4 that will service all twenty of its adjoining private floors (floor 61 to floor 80). In this embodiment, if Company C operates two elevators cabs within its private section of Shaft S4 both moving in the same direction, and does not require that both elevator cabs can access all of its adjoining floors in each direction, then the building's central elevator computer control system can handle these simple requirements without any cab collisions or storage slots.

But if Company C requires that both cabs can access all of its floors in each direction then, according to an embodiment, the cab slot for the floor at each end of a private elevator shaft section may be shared by the cabs of each neighboring company. The elevator control system may then be programmed so that only one neighboring cab (i.e. cab B2 shown on FIG. 12) can enter the shareable slot (i.e. at floor 80 or floor 81) at the same time, and that the other neighboring cab (i.e. cab C1 shown on FIG. 12) must delay its entry into either of those shareable slots until the shareable slot is empty again.

In an alternate embodiment, the elevator control system can require that during business hours, all private elevators in the building can only continuously move in the same direction (i.e. up or down) at all times so that each shareable slot in the direction of such motion will always be available for entry. Then during non-business hours the control system can require that only one elevator can be operated in any direction in Shaft 4, or that the nearby stairs may be infrequently required for passengers to access a certain adjacent floor. It should be realized that there are also other possible solutions for these problems.

If there are even twenty or more companies in the 120-floor building described in FIG. 12 that desire to have a private elevator operate between their adjoining floors in the same hoistway (instead of six), this desire can also be accommodated by the computer control system and the elevator system described in FIG. 8 through FIG. 12.

With regard to any of the above described private elevator embodiments, if a company wishes to expand into vacant adjoining floors, the elevator control system can instantly accommodate these desires by a simple computer program change, and without any costly or time consuming physical changes to a private elevator cab or a private elevator shaft. The same is true if any company wishes to sell or surrender any adjoining floors to a neighboring company. Thus it has been demonstrated that the embodiments of present invention and its computer control method have great efficiencies and flexibilities. In another embodiment, when the occupants of any of the above described private elevator floors wish to travel to the floors of another company in the building (e.g. the street level on floor 1, or any of the attic [storage] or basement [parking] floors), they can use the elevator cabs in Shaft S1 or Shaft S2 or Shaft S3 that are available for the general public.

Figure 13:
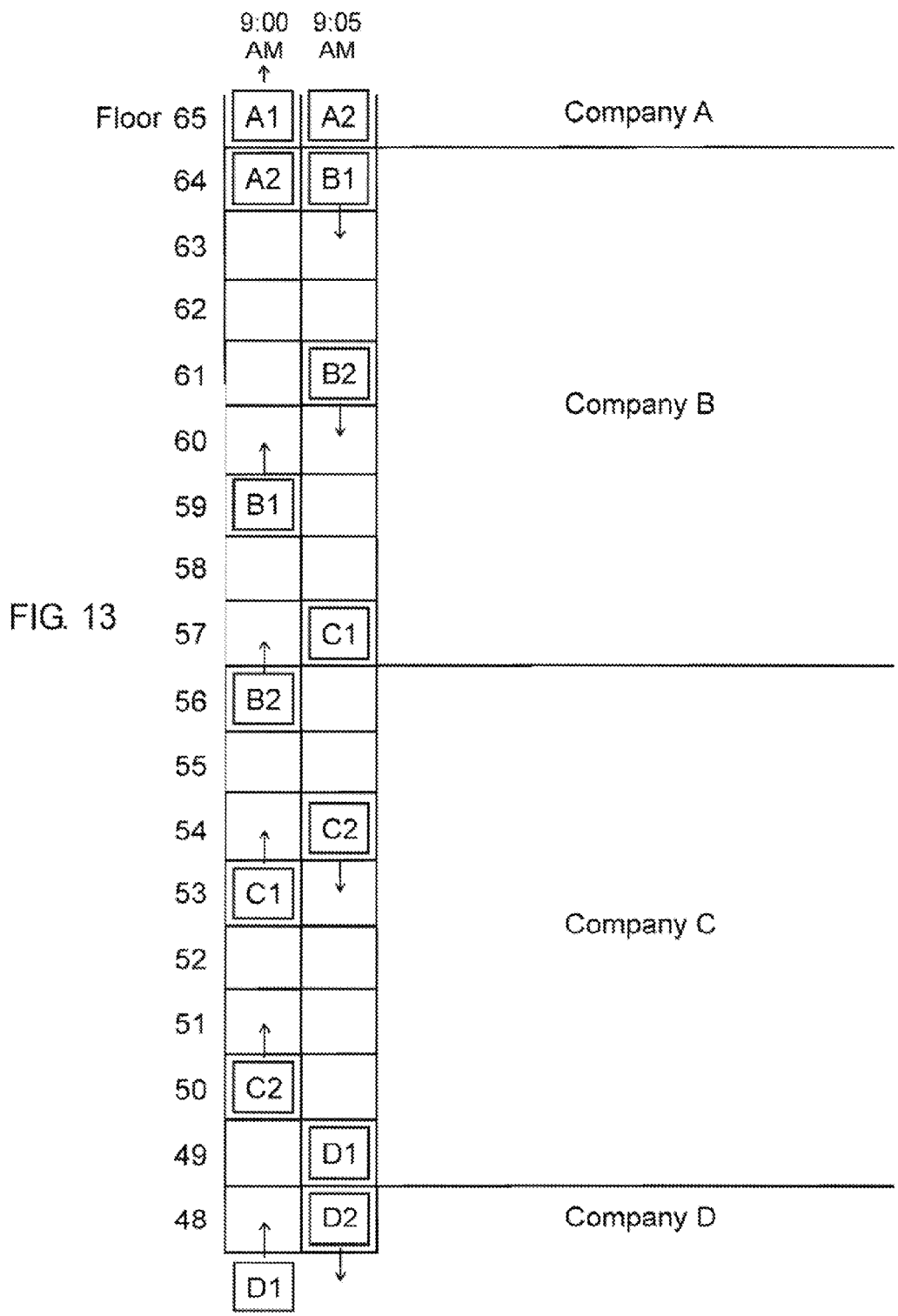
FIG. 13 is an illustration of two different private sections of the same hoistway wherein elevator slots may be shared by two different neighboring private elevator cabs over a period of time, according to one embodiment of the present invention.

FIG. 13 is an illustration of two different private sections in the same hoistway where elevator slots may be shared by two different neighboring elevator cabs at two different times, according to one embodiment of the present invention. As shown in FIG. 13, four companies (A, B, C, D) occupy premises with adjoining floors in a tall building. In one embodiment, Company A and Company B have shareable slots on floors 64 and 65; Company B and Company C have shareable slots on floors 56 and 57; Company C and Company D have shareable slots on floors 48 and 49.

As shown on FIG. 13, at 9:00 AM, private elevator cab A2 has already unloaded its Company A passengers on floor 65 and is now stored in Company B's shareable slot on floor 64. Private cab A1 is loading Company A employees on floor 65 and is preparing to ascend to upper destinations on Company A's adjoining floors. Private cab B1 has already unloaded and loaded its Company B passengers on floor 57 and is now ascending to service Company B floors 60 through 64. Cab B2 is stored in Company C's shareable slot on floor 56 and is beginning to move up to slot 57 to load Company B passengers destined for higher Company B adjoining floors. Private cab C1 is ascending to service Company C floors 54 through 56, and then it will be stored in Company B's shareable slot on floor 57 after cab B2 moves up to slot 58. Private cab C2 has already picked up Company C passengers on floor 49 and is ascending to service other Company C floors. Private cab D1 is just entering the shareable slot on floor 48 to unload Company D passengers and will then dock in Company C's shareable slot on floor 49 that cab C2 has just vacated.

As shown on FIG. 13, at 9:05 A.M. private elevator cab D2 has just picked up Company D passengers on floor 48 and is descending through company D's private section of the hoistway to service lower Company D adjoining floors. Private cab D1 is docked in Company C's shareable slot on floor 49, and is preparing to follow cab D1 down through Company D's floors. Private cab C2 has already serviced Company C's floors 56 through 54 and is preparing to service Company C floors 53 through 50, and also floor 49 after cab D1 has exited that shareable slot. Private cab C1 is docked in Company B's shareable slot on floor 57 and is preparing to follow cab C2 down through Company C's adjoining floors. Private cab B2 has already serviced Company B's upper floors and is descending through Company B's private section of the hoistway to service Company B's lower floors until it docks in Company C's shareable slot on floor 56 after cab C1 has moved down to floor 55. Private cab B1 has already vacated shareable slot 65, has picked up Company B passengers on floor 64 and is now descending to service lower Company B floors. Cab A2 has just unloaded Company A passengers on floor 65 and will dock in Company B's sharable slot on floor 64 after cab B1 has exited that slot. The motions of all of the above cabs are controlled by the building's central elevator control system in conjunction with electronic and optical sensors located on such cabs and within the private elevator hoistway S4, in one embodiment.

FIGS. 14A through 14G illustrate how one counterweight channel 410 can be shared by the counterweights 120 of a plurality of elevator cabs, in one embodiment of the invention. This sharing of counterweight channels 410 can decrease the necessary size for hoistways and/or increase passenger capacity of the larger elevator cabs that can operate in a given hoistway. In FIG. 12, counterweight channels extend from Floor 120 down to Floor 1 in Shaft S4 (not illustrated). According to the following embodiments, a 120-floor building may have all of the counterweights connected to cab A1, cab B1, and cab C1 in Shaft S4 sharing the same counterweight channels 410 for purposes of economy of space and in order to maximize the number of passengers that can be transported by each cab in the same elevator Shaft S4.

In an embodiment, as shown on FIG. 14A, FIG. 14B, FIG. 14C, and FIG. 14D, there are three vertical sections of the same counterweight channel: 410A, 410B, and 410C. In this configuration, counterweight 120A is positioned in a lower vertical section 410C, counterweight 120B is positioned in a middle vertical section 410B, and counterweight 120C is positioned in an upper vertical section 410A. The counterweight cables 210A connected to counterweight 120A pass through vertical counterweight cable passages 1400B located on each side of counterweight 120B connected to cab B1 (not shown), and they also pass through even larger vertical counterweight cable passages 1400C located on each side of counterweight 120C connected to cab C1 (not shown). Therefore, counterweight 120A and its associated counterweight cables 210A can move independently of the counterweights 120B and 120C up and down through section 410C of counterweight channel 410 between adjoining floors 80 and 61 as shown on FIG. 12. Counterweight 120A can only move within section 410A of counterweight channel 410 if it is attached to a personal elevator cab 110 that only moves through a certain section of hoistway 100 that is associated with adjoining floors of a certain occupant. See shaft S4 on FIG. 12. But if counterweight 120A is attached to an elevator cab 110 that moves through the entire hoistway 100 in one direction, then counterweight 120A can also move through the entire counterweight channel 410 in one direction for the same distance as its associated elevator cab 110. See shaft S1 on FIG. 12.

In addition, counterweight cables 210B connected to counterweight 120B can pass through even larger vertical counterweight cable passages 1400C located on each side of counterweight 120C attached to cab C1 (not shown). Therefore, counterweight 120B and its associated counterweight cables 210B can move independently of counterweights 120A and 120C up and down section 410B of the counterweight channel 410 between adjoining floor 100 and floor 81 as shown on FIG. 12. Counterweight 120B can only move within section 410B of counterweight channel 410 if it is attached to a personal elevator cab 110 that only moves through a certain section of hoistway 100 that is associated with adjoining floors of a certain occupant. See shaft S4 on FIG. 12. But if counterweight 120B is attached to an elevator cab 110 that moves through the entire hoistway 100 in one direction, then counterweight 120B can also move through the entire counterweight channel 410 in one direction for the same distance as its associated elevator cab 110. See shaft S1 on FIG. 12.

Naturally counterweight 120C and its associated counterweight cable 210C can also move independently of the other counterweights 120A and 120B up and down section 410A of counterweight channel 410 between adjoining floor 120 and floor 101 as shown on FIG. 12, because there are no counterweights 120 or counterweight cables 210 in section 410A of the common counterweight channel 410 that could obstruct its motion. Counterweight 120C can only move within section 410A of counterweight channel 410 if it is attached to a personal elevator cab 110 that only moves through a certain section of hoistway 100 that is associated with adjoining floors of a certain occupant. See shaft S4 on FIG. 12. But if counterweight 120C is attached to an elevator cab 110 that moves through the entire hoistway 100 in one direction, then counterweight 120C can also move through the entire counterweight channel 410 in one direction for the same distance as its associated elevator cab 110. See shaft S1 on FIG. 12.

All of the counterweights 120 are separated vertically from each other, and all of the counterweight cables 210 are separated horizontally from each other. One end of the above described counterweight cables 210 is attached to an associated counterweight connection point 240 located on their associated cabs 110 (not shown) and the other end of such cables 210 is attached to an associated counterweight connecting eye 350 located on the top of their associated counterweights 120.

In another embodiment, the counterweights 120 (not shown) of private elevator cabs D1, E1 and F1 as shown on FIG. 12 can also share the same counterweight channel 410 in the same manner as described above.

The side view of shaft S4 (FIG. 14A) illustrates a counterweight 120A (connected to cab A1) located in Company C's section of shaft S4, a counterweight 120B (connected to cab B1) located in Company B's section of shaft S4, and a counterweight 120C (connected to cab C1) located in Company A's section of shaft S4. All of the counterweights 120 can move independently of all of the other counterweights 120 and their associated counterweight cables 210, because none of such counterweight cables 210 are in contact with or interfere with the motions of any of such counterweights 120 or such counterweight cables 210. All of such counterweight cables 210A pass through the vertical counterweight cable passages 1400C and 1400B located respectively on counterweights 120C and 120B. Similarly, no counterweight 120 can collide with or interfere with any other counterweight 120 because each counterweight 120 can only move a limited distance in one direction through counterweight channel 410 between vertically adjoining floors (i.e. its vertical section) of the 120-floor building as shown on FIG. 12.

Figure 14D:
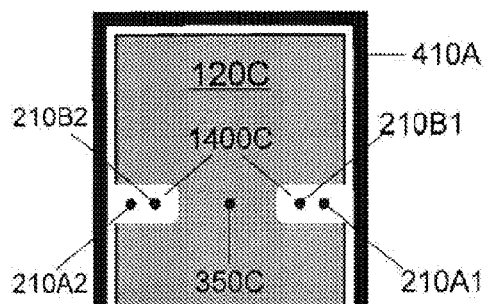
FIGS. 14B, 14C and 14D illustrate the top plan views of three counterweights taken along the respective sectional lines of FIG. 14A, each of the counterweights sharing one counterweight channel that can be shared by the counterweights of a plurality of elevator cabs, according to one embodiment of the present invention.
Figure 14C:
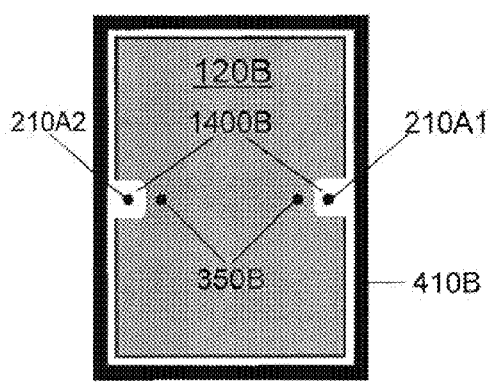
Figure 14B:
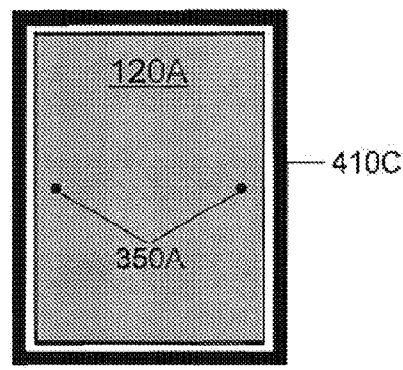

FIG. 14B, FIG. 14C and FIG. 14D show the top view of each respective counterweight 120 which is moving through counterweight channel 410 located in Shaft S4. In an embodiment, a counterweight 120A (which is connected to cab A1 in Shaft S4) is guided through section 410C of counterweight channel 410. Two counterweight cables 210A (shown on FIG. 14A) are attached to counterweight cable connecting eyes 350A, one eye on each side of counterweight 120A. In a second embodiment, counterweight 120B (which is connected to cab B1 in Shaft S4) is guided through section 410B of counterweight channel 410. Two counterweight cables 210B (shown on FIG. 14A) are attached to counterweight cable connecting eyes 350B, one eye at each middle position of counterweight 120B. In a third embodiment, counterweight 120C (which is connected to cab C1 in Shaft S4) is guided through section 410A of counterweight channel 410. One counterweight cable 210C (shown on FIG. 14A) is attached to the counterweight cable connecting eye 350C located at the center of counterweight 120C, because there are no other counterweights located or moving above counterweight 120C that could interfere with its center located counterweight cable 210C.

In one embodiment, the two counterweight cables 210A (connected to cab A1) pass through vertical counterweight cable passages 1400B located on either side of the middle of counterweight 120B and also through even larger vertical counterweight cable passages 1400C located on either side of the middle of counterweight 120C. These vertical counterweight cable passages enable counterweight 120A to move up and down through section 410C of counterweight channel 410 without obstruction and independently of the motions of counterweights 120B and 120C which share the same counterweight channel 410. Similarly, the two counterweight cables 210B (connected to cab B1) also pass through vertical counterweight cable passages 1400C located on either side of the middle of counterweight 120C. These larger vertical counterweight cable passages 1400C enable counterweight 120B to move up and down through section 410B of counterweight channel 410 without obstruction and independently of the motions of counterweights 120A and 120C which share the same counterweight channel 410. FIG. 14F illustrates all of the above elements and embodiments from a different three dimensional perspective.

Figure 14A:
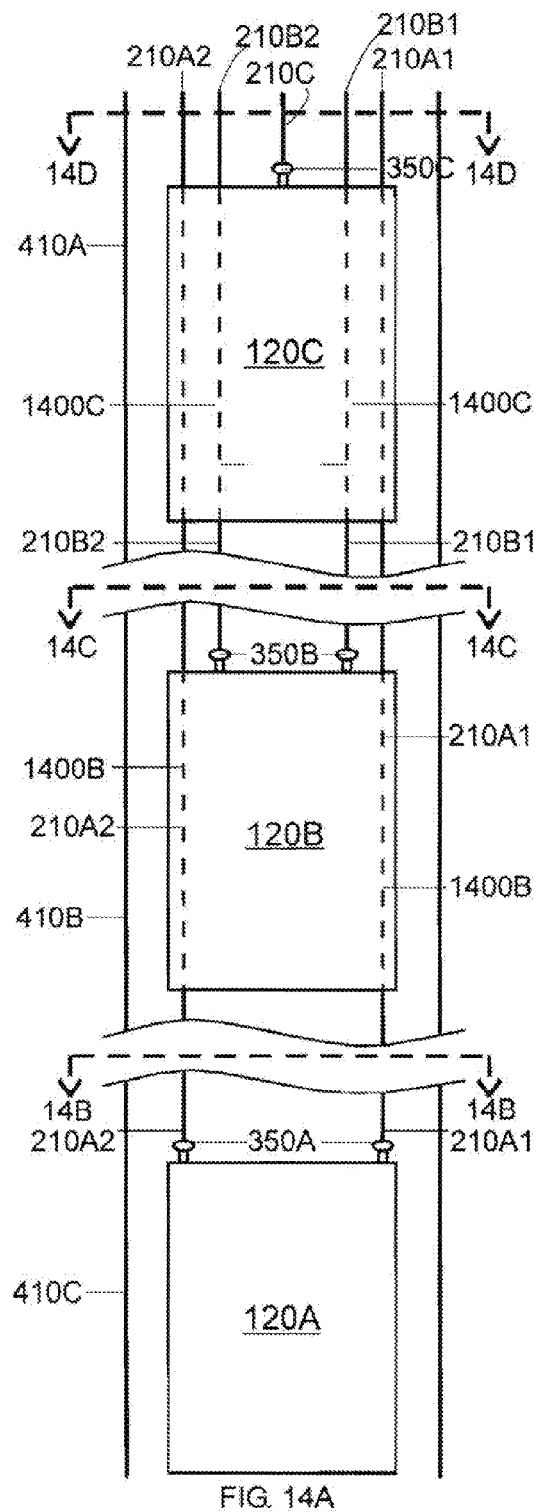
FIG. 14A is an illustration of the side view of one counterweight channel that can be shared by the counterweights of a plurality of elevator cabs, according to one embodiment of the present invention.
Figure 14E:
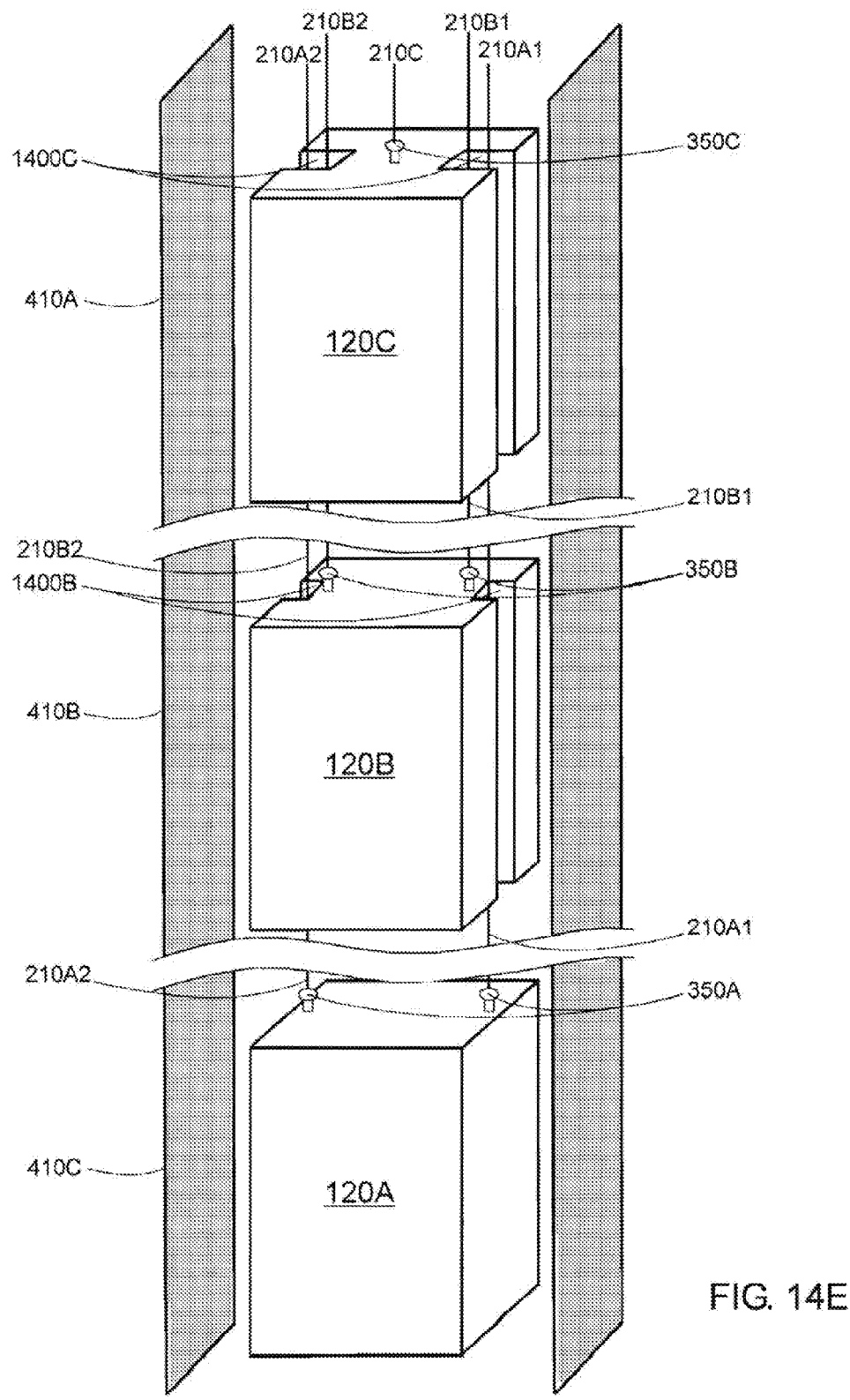
FIG. 14E is an illustration of one counterweight channel from another perspective that can be shared by the counterweights of a plurality of elevator cabs, according to one embodiment of the present invention.
Figure 14F:
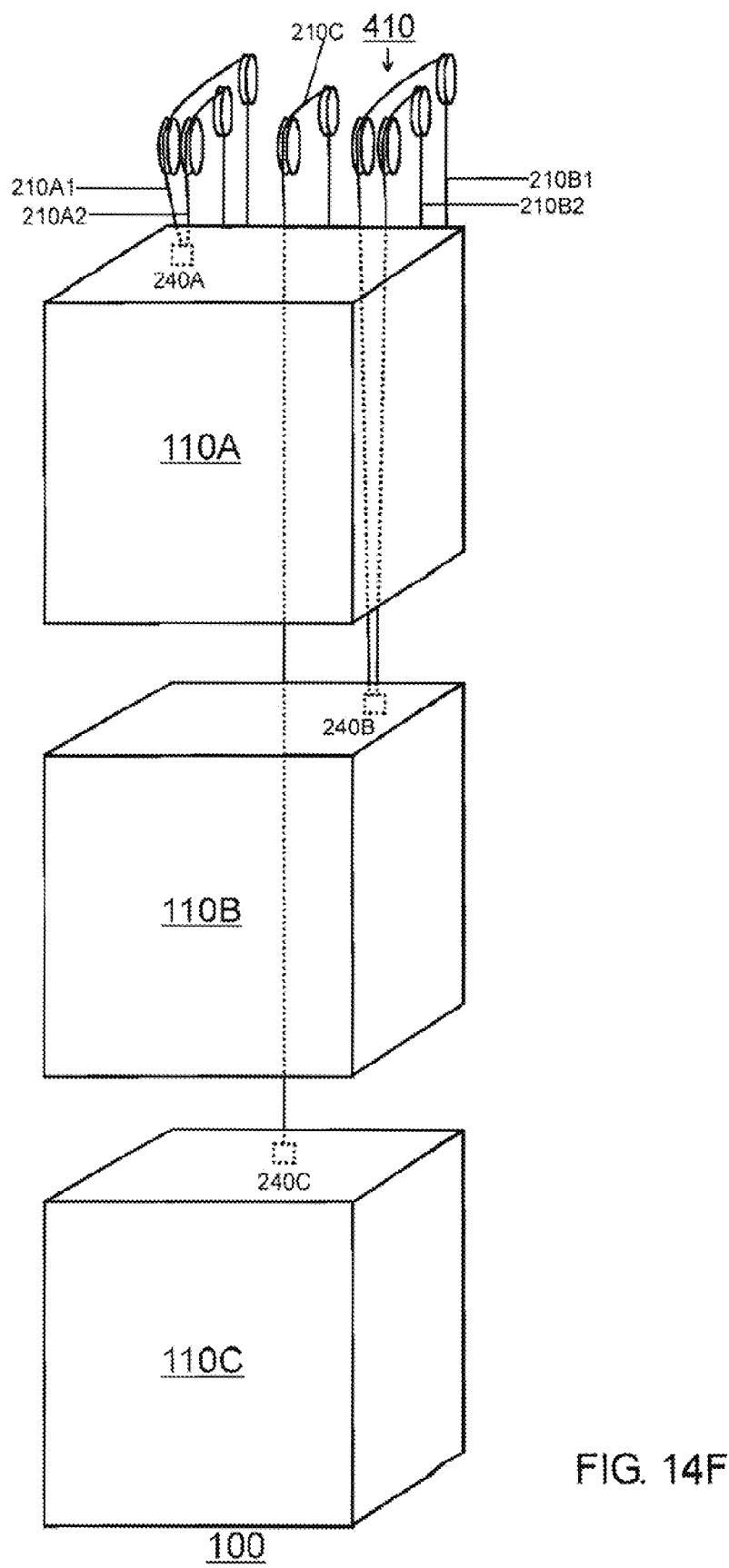
FIGS. 14F and 14G are illustrations of the counterweight cables attached to different cabs that share a counterweight channel, which shows how the counterweight cables are routed over pulleys and are then connected to their associated elevator cabs.

In one embodiment, as shown in FIG. 14A, counterweight 120A is shown as a certain size, counterweight 120B is shown as slightly larger than counterweight 120A in order to account for the loss of weight of counterweight 120B due to its two vertical counterweight cable passages 1400B, and counterweight 120C is shown as slightly larger than counterweight 120B in order to account for the greater loss of weight of counterweight 120C due to its two even larger counterweight cable passages 1400C.

Figure 14G:
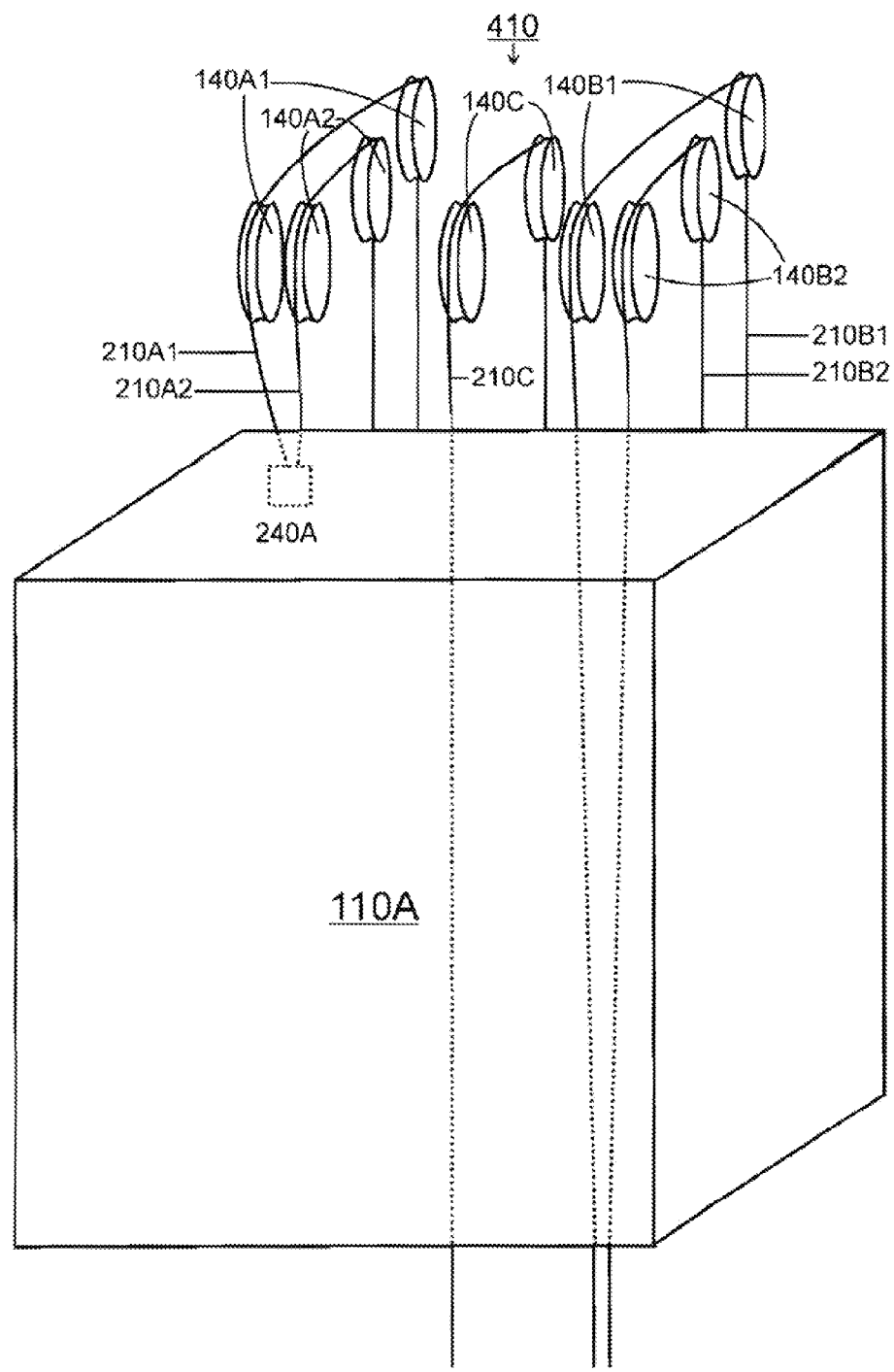

FIG. 14F and FIG. 14G illustrate how the counterweight cables 210 shown on FIG. 14A through 14E are routed in an embodiment up and over pulleys 140 positioned at the top of a section of the counterweight channel 410, and then are attached to each counterweight cable connection point 240 located along a top side of each cab 110A, 110B, and 110C. In an embodiment, the right counterweight cable 210A1-attached to counterweight 120A is routed up through the right counterweight cable passage 1400B and the right counterweight cable passage 1400C (as illustrated on FIGS. 14A, 14B, 14C, and 14D), then up and over rear pulley 140A1, across the top of a section of counterweight channel 410 to front pulley 140A1, then over front pulley 140A1, and down hoistway 100, and then is attached to counterweight connection point 240A located on a top side of cab 110A, as shown on FIGS. 14F and 14G. The left counterweight cable 210A2 attached to counterweight 120A is routed through the left counterweight cable passage 1400B and the left counterweight cable passage 1400C (as shown on FIGS. 14A through 14D), then up and over rear pulley 140A2, across the top of a section of counterweight channel 410 to front pulley 140A2, then over front pulley 140A2, and down hoistway 100, and then is also attached to counterweight connection point 240A, as shown on FIGS. 14F and 14G.

Similarly, the right counterweight cable 210B1 attached to counterweight 120B is routed up and through the right counterweight cable passage 1400C, then up and over rear pulley 140B1, across the top of a section of counterweight channel 410 to front pulley 140B1, then over front pulley 140B1, and down hoistway 100, and then is attached to counterweight connection point 240B located on a top side of cab 110B, all as shown on FIGS. 14A to 14G. The left counterweight cable 210B2 is routed up and through the left counterweight cable passage 1400C, then up and over rear pulley 140B2, across the top of a section of counterweight channel 410 to front pulley 140B2, and over front pulley 140B2, and down hoistway 100, and then is attached to counterweight connection point 240B, located on cab 110B, all as shown on FIGS. 14A to 14G.

Counterweight cable 210C attached to counterweight 120C is routed up and over rear pulley 140C, across the top of a section of counterweight channel 410 to front pulley 140C, then over front pulley 140C, and down hoistway 100, and then it is attached to counterweight connection point 240C, located on cab 110C, all as shown on FIGS. 14A to 14G. All of the counterweight cables 210 and their associated pulleys 140 are separated horizontally and/or vertically from each other, so as not to interfere with each other. In all of the above descriptions for FIGS. 14F and 14G the terms 'rear' and 'front' pulleys mean with respect to a certain cab.

It is also envisioned that a plurality of cabs (for example, ten or twenty cabs) in an embodiment, using a system similar to the above described method of sharing counterweight channels, can utilize only four counterweight channels for all of their counterweights in a hoistway of a tall building to service a plurality of separately adjoining floors or other floors (for example, two hundred or more floors).

FIGS. 15A, 15B, 15C, and 15D illustrate four elevator cabs 110A, 110B, 110C and 110D aligned vertically one above the other in a hoistway 100, each with just two counterweights 120 positioned symmetrically on the opposite sides of each cab 110. For example as shown on FIG. 15A, the top cab 110A has a counterweight 120A located within a counterweight channel 410A aligned with a counterweight connection point 240A, and all of those elements are located next to the rear of the rear right quadrant of cab 110A. One end of a counterweight cable 210A can be attached to a counterweight connection point 240A and the other end of cable 210A can be attached to a top center of a counterweight 120A. Also as shown on FIG. 15A, cab 110A has a second counterweight 120A located within another counterweight channel 410A, and all of these elements are located next to the front of the front left quadrant of cab 110A. One end of a counterweight cable 210A can be attached to another connection point 240A and the other end of cable 210A can be attached to a top center of another counterweight 120A. All of these elements are positioned symmetrically with respect to each other and operate in unison.

Figure 15A:
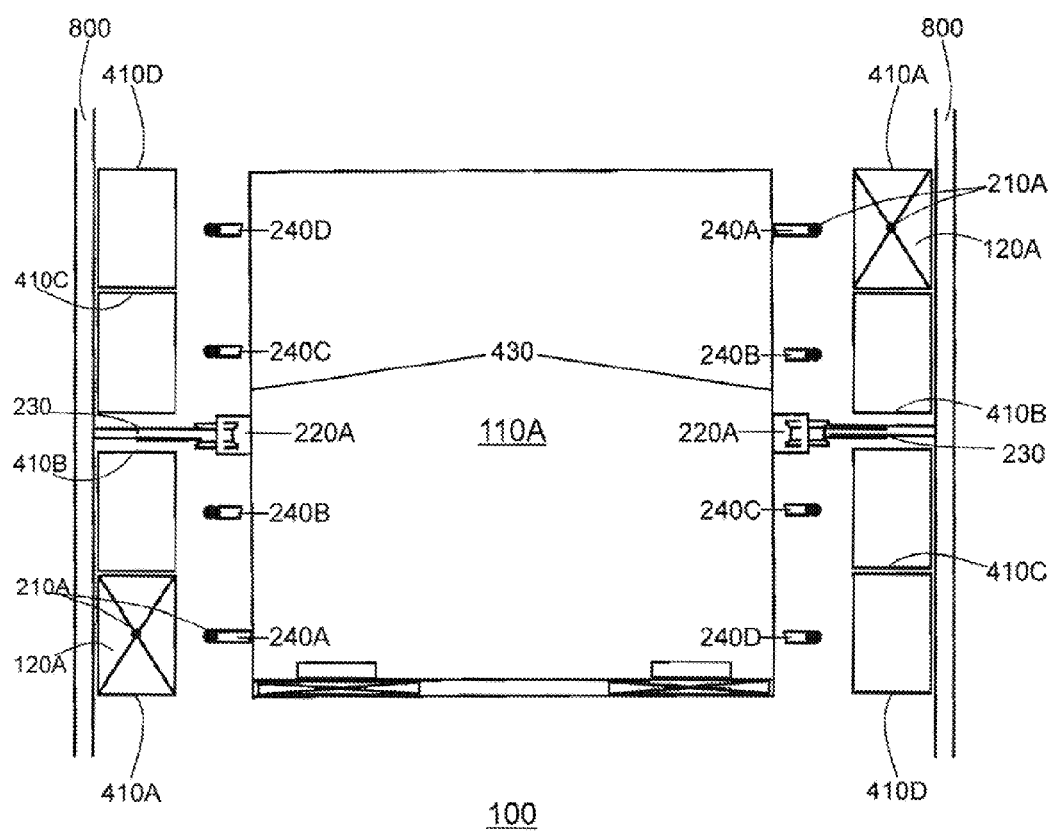
FIGS. 15A to 15D are respective illustrations of the top view of cabs 1, 2, 3 and 4 in a hoistway that show how each cab is connected to, among other things, counterweights, counterweight cables, and the vertical guide tracks, in accordance with one embodiment of the present invention.
Figure 15B:
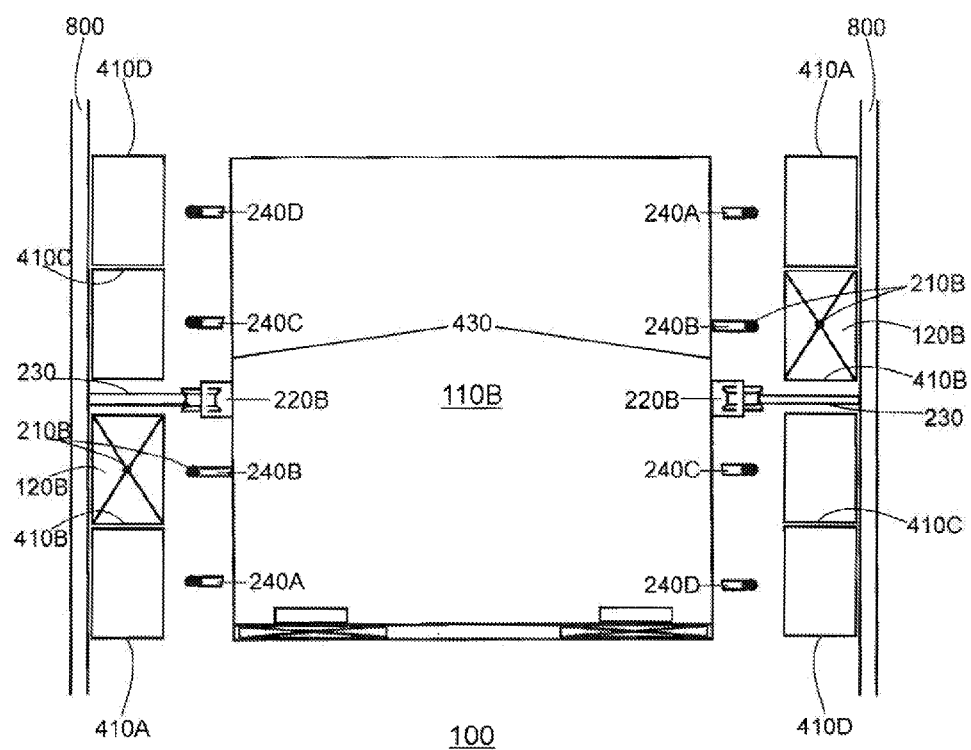

As shown on FIG. 15B, cab 110B (positioned next below cab 110A) has a counterweight 120B located within a counterweight channel 410B aligned with counterweight connection point 240B, and all of these elements are located next to the front of the rear right quadrant of cab 110B. One end of a counterweight cable 210B can be attached to a counterweight connection point 240B, and the other end of cable 210B can be attached to a top center of a counterweight 120B. Also as shown on FIG. 15B, cab 110B has a second counterweight 120B located within another counterweight channel 410B, and all of these elements are located next to the rear of the front left quadrant of cab 110B. One end of a counterweight cable 210B can be attached to another connection point 240B and the other end of cable 210B can be attached to a top center of another counterweight 120B. All of these elements are positioned symmetrically with respect to each other and operate in unison.

Figure 15C:
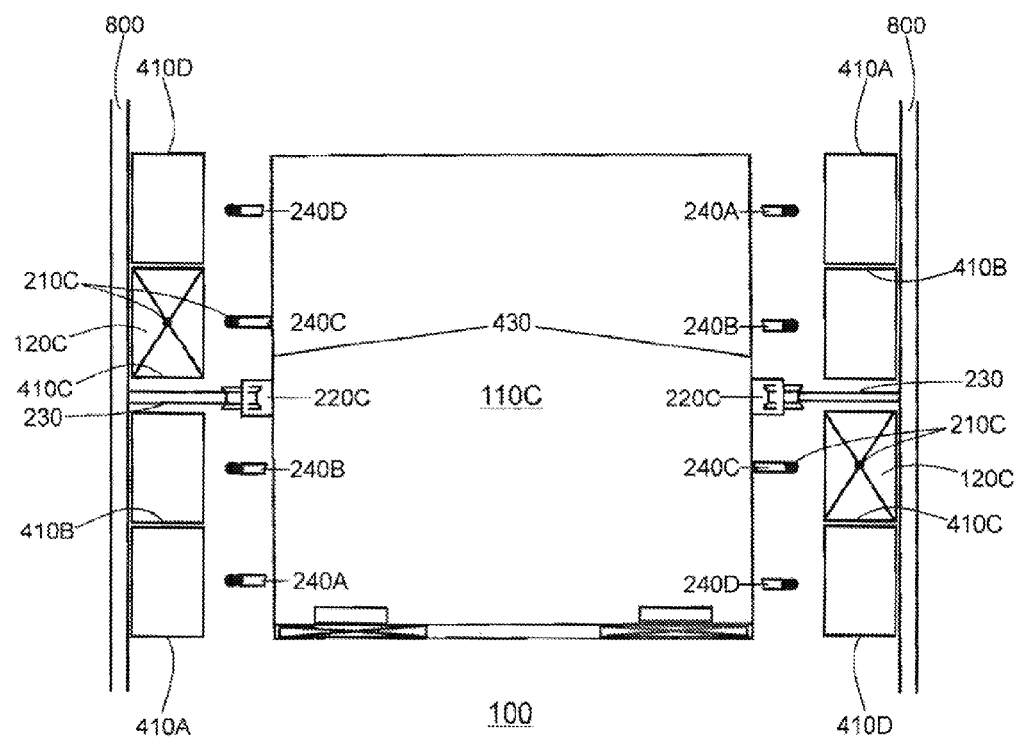

As shown on FIG. 15C, cab 110C (positioned next below cab 110B) has a counterweight 120C located within a counterweight channel 410C aligned with counterweight connection point 240C, and all of such elements are located next to the front of the rear left quadrant of cab 110C. One end of a counterweight cable 210C can be attached to a counterweight connection point 240C and the other end of cable 210C can be attached to a top center of another counterweight 120C. Also as shown on FIG. 15C, cab 110C has a second counterweight 120C located within another counterweight channel 410C, and all of these elements are located next to the rear of the front right quadrant of cab 110C. One end of a counterweight cable 210C can be attached to the connection point 240C and the other end of cable 210C can be attached to a top center of another counterweight 120C. All of such elements are positioned symmetrically with respect to each other and operate in unison.

Figure 15D:
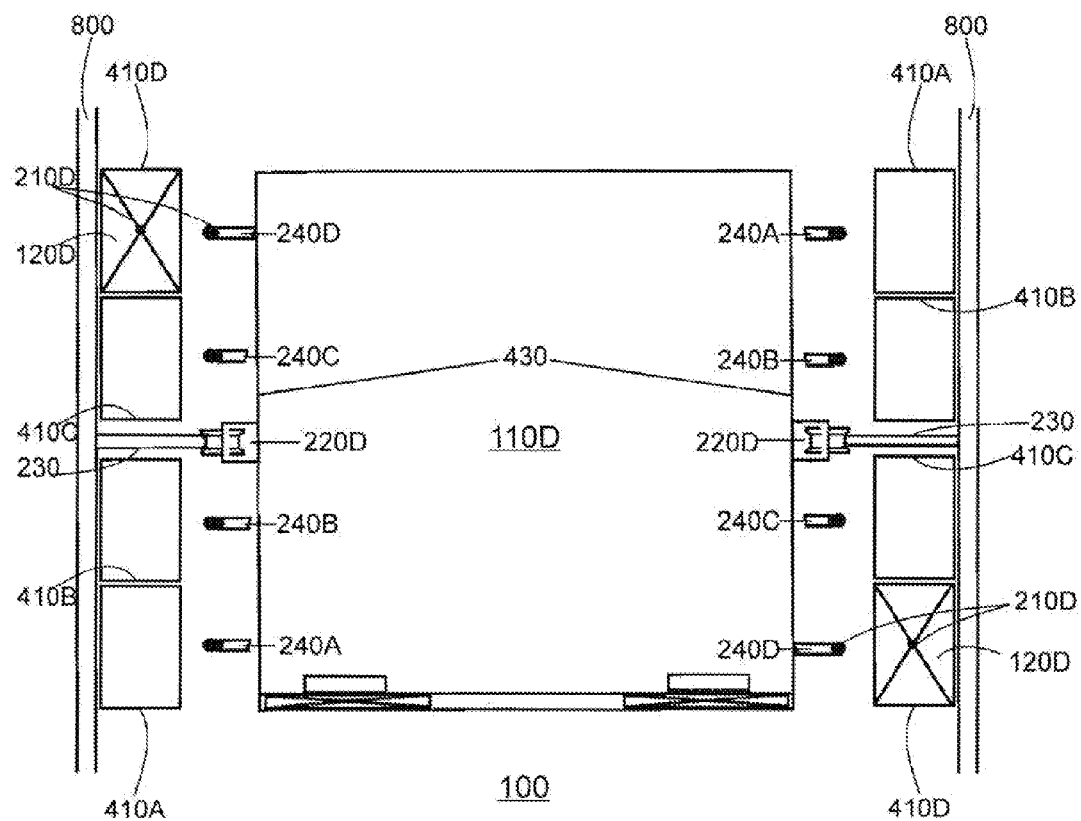

As shown on FIG. 15D, the bottom cab 110D has a counterweight 120D located within a counterweight channel 410D aligned with counterweight connection point 240D, and all of such elements are located next to the rear of the rear left quadrant of cab 110D. One end of a counterweight cable 210D can be attached to the counterweight connection point 240D and the other end of cable 210D can be attached to a top center of counterweight 120D. Also as shown on FIG. 15D, cab 110D has a second counterweight 120D located within another counterweight channel 410D, and all of these elements are located next to the front of the front right quadrant of cab 110D. One end of another counterweight cable 210D can be attached to another connection point 240D and the other end of cable 210D can be attached to a top center of another counterweight 120D. All of these elements are positioned symmetrically with respect to each other and operate in unison.

All of the elements described in FIG. 15A to FIG. 15D (other than cabs) are separated horizontally with respect to each other so as not to interfere with one another. Each of the counterweight channels 410 can be attached to a hoistway wall 800 located on opposite sides of a hoistway 100. Each of the cabs 110 can move independently of the others throughout hoistway 100 with only two counterweights 120 symmetrically connected to each of such cabs 110 instead of four counterweights as previously described. Each cab 110 can be guided along two opposing guide tracks 230 by two or more guide apparatuses 220 attached to each exterior side 430 of each cab 110.

FIGS. 16A, 16B, 16C and 16D illustrate four elevator cabs 110A, 110B, 110C, and 110D aligned vertically one above the other in a hoistway 100, each with just one counterweight 120 positioned symmetrically on one side of each cab 110, and with one motor lift cable 136 positioned symmetrically on the opposite side of each cab 110. For example in FIG. 16A the top cab 110A has one counterweight 120A located within a counterweight channel 410A aligned with a counterweight connection point 240A, and all of these elements are located next to the rear of the rear right quadrant of cab 110A. One end of a counterweight cable 210A can be attached to a counterweight connection point 240A and the other end of cable 210A can be attached to a top center of counterweight 120A. Also, as shown on FIG. 16A, cab 110A has a lift motor connection point 150A attached to the front of the front left quadrant of cab 110A. One end of a lift motor cable 136A can be attached to the motor lift connection point 150A and the other end of cable 136A can be wound around a shaft of a dedicated lift motor 130A located in the attic 810 of a building (not shown). As motor 130A pulls the cab 110A up or down in the hoistway 100 counterweight 120A stabilizes and balances one side of cab 110A as it moves through the hoistway 100, and lift motor cable 136A provides both the function of pulling the cab 110 in a certain direction of the hoistway 100, and the function of stabilizing and balancing the other side of the cab 110A as it moves through the hoistway 100. All of these elements are positioned symmetrically with respect to each other and operate in unison.

Figure 16A:
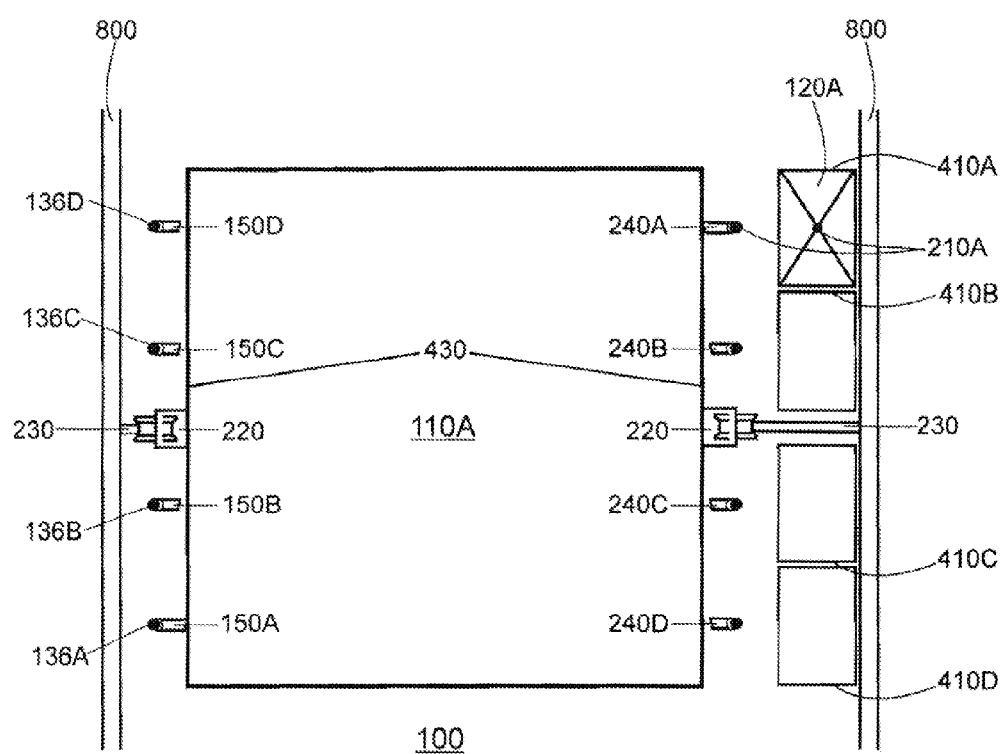
FIGS. 16A to 16D are respective illustrations of the top view of cabs 1, 2, 3 and 4 in a hoistway that show how each cab is connected to, among other things, a counterweight, a counterweight cable, a lift cable, and the vertical guide tracks, in accordance with one embodiment of the present invention.
Figure 16B:
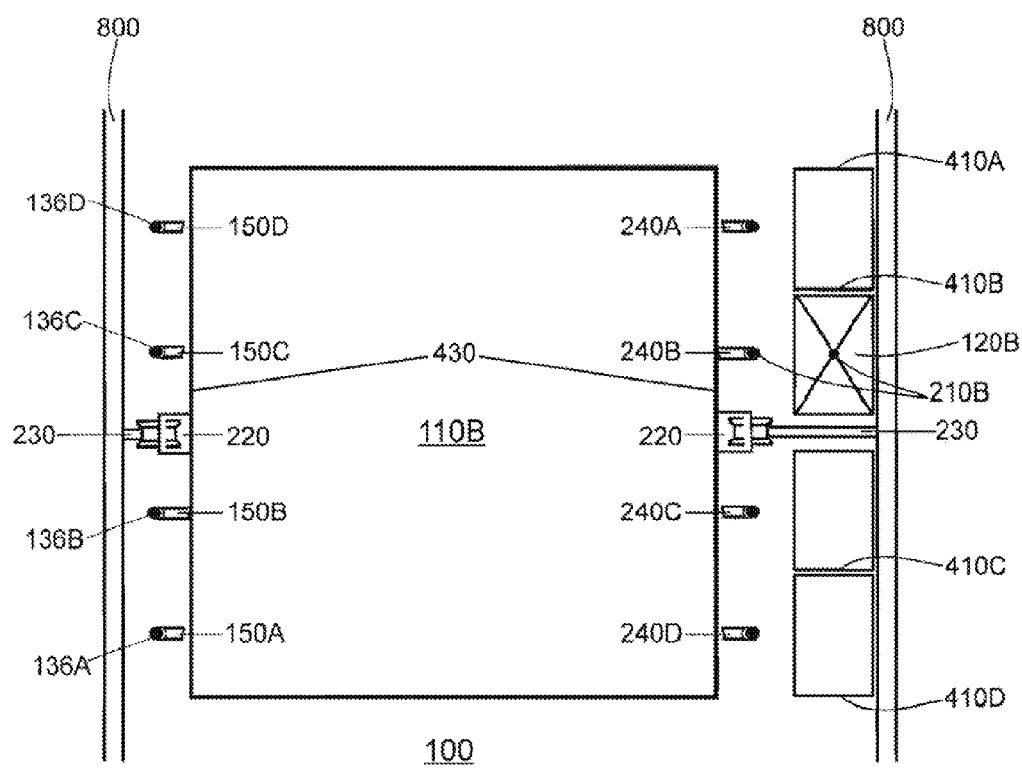

As shown on FIG. 16B, cab 110B (positioned next below cab 110A) has one counterweight 120B located within a counterweight channel 410B aligned with a counterweight connection point 240B, and all of these elements are located next to the front of the rear right quadrant of cab 110B. One end of a counterweight cable 210B can be attached to a counterweight connection point 240B and the other end of cable 210B can be attached to a top center of counterweight 120B. Also, as shown on FIG. 16B, cab 110B has a lift motor connection point 150B attached to the rear of the front left quadrant of cab 110B. One end of a lift motor cable 136B can be attached to the lift motor connection point 150B and the other end of cable 136B can be wound around a shaft of the dedicated lift motor 130B located in the attic 810 of the building (not shown). As lift motor 130B pulls cab 110B up or down in the hoistway 100 counterweight 120B stabilizes and balances one side of cab 110B as it moves through the hoistway 100, and lift motor cable 136B provides both the function of pulling cab 110 in a certain direction of the hoistway 100, and the function of stabilizing and balancing the other side of the cab 110B as it moves through the hoistway 100. All of these elements are positioned symmetrically with respect to each other and operate in unison.

Figure 16C:
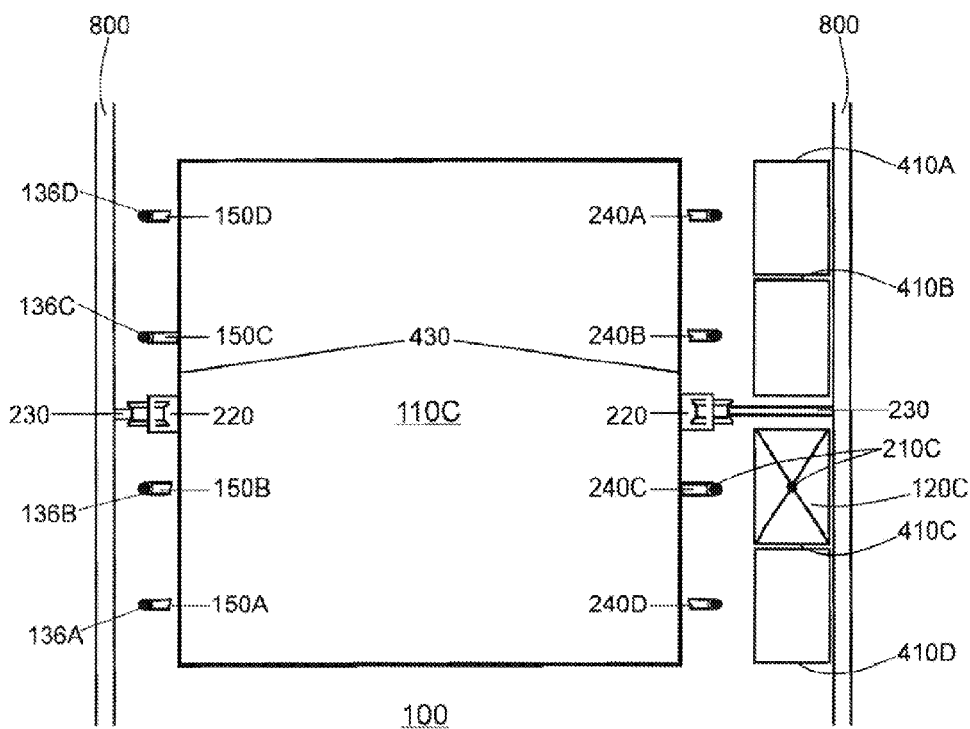

As shown on FIG. 16C, cab 110C (positioned next below cab 110B) has a counterweight 120C located within a counterweight channel 410C aligned with counterweight connection point 240C, and all of these elements are located next to the rear of the front right quadrant of cab 110C. One end of a counterweight cable 210C can be attached to a counterweight connection point 240C and the other end of the cable 210C can be attached to a top center of counterweight 120C. Also, as shown on FIG. 16C, cab 110C has a lift motor connection point 150C attached to the front of the rear left quadrant of cab 110C. One end of a lift motor cable 136C can be attached to the lift motor connection point 150C and the other end of cable 136C can be wound around a shaft of the dedicated lift motor 130C located in the attic 810 of the building (not shown). As lift motor 130C pulls cab 110C up or down in the hoistway 100 the counterweight 120C stabilizes and balances one side of cab 110C as it moves through the hoistway 100, and lift motor cable 136C provides both the function of pulling the cab 110 in a certain direction of the hoistway 100 and the function of stabilizing and balancing the other side of cab 110C as it moves through the hoistway 100. All of these elements are positioned symmetrically with respect to each other and operate in unison.

Figure 16D:
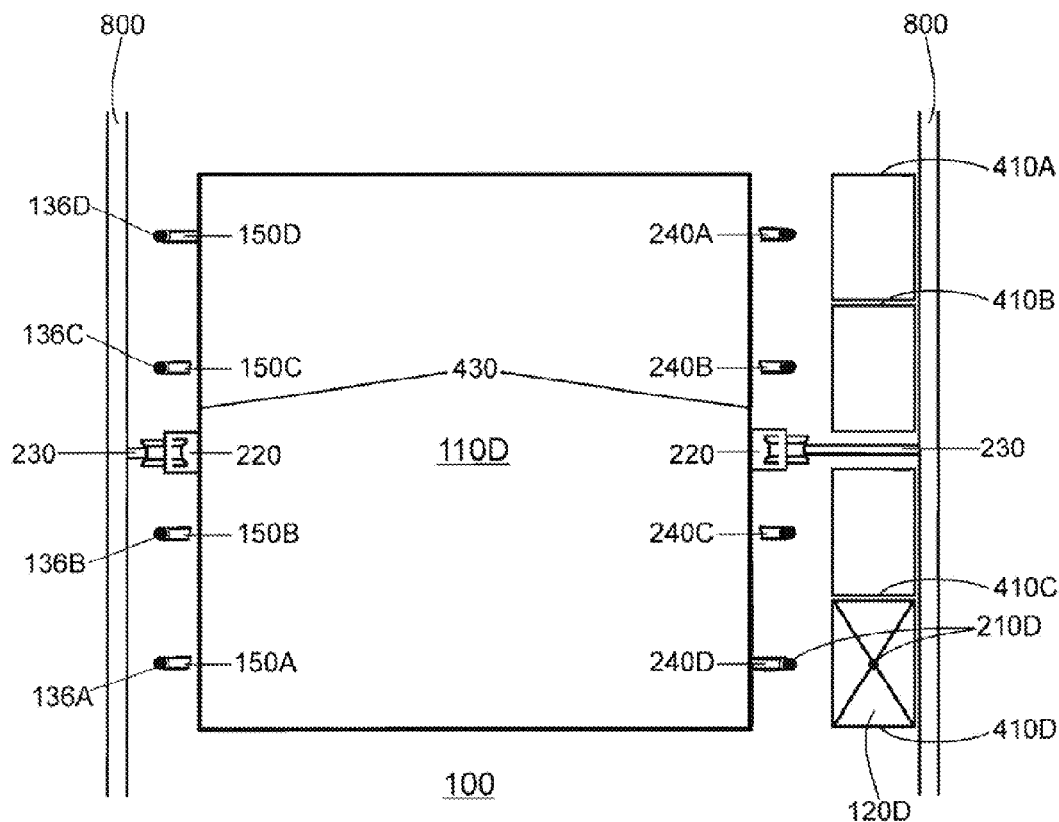

As shown on FIG. 16D, the bottom cab 110D has a counterweight 120D located within a counterweight channel 410D aligned with counterweight connection point 240D, and all of these elements are located next to the front of the front right quadrant of cab 110D. One end of a counterweight cable 210D can be attached to a counterweight connection point 240D and the other end of cable 210D can be attached to a top center of counterweight 120D. Also, as shown on FIG. 16D, cab 110D has a lift motor connection point 150D attached to the rear of the rear left quadrant of cab 110D. One end of a lift motor cable 136D can be attached to the lift motor connection point 150D and the other end of cable 136D can be wound around a shaft of the dedicated lift motor 130D located in the attic 810 of the building (not shown). As the lift motor 130D pulls cab 110D up or down in the hoistway 100 the counterweight 120D stabilizes and balances one side of cab 110D as it moves through the hoistway 100, and lift motor cable 136D provides both the function of pulling the cab 110 in a certain direction of the hoistway 100, and the function of stabilizing and balancing the other side of the cab 110D as it moves through the hoistway 100. All of these elements are positioned symmetrically with respect to each other and operate in unison.

All of the elements described in FIG. 16A to FIG. 16D (other than cabs) are separated horizontally with respect to each other so as not to interfere with one another. Each of the counterweight channels 410 can be attached to a hoistway wall 800 located on opposite sides of the hoistway 100. Each of the cabs 110 can move independently of the others throughout hoistway 100 with only one counterweight 120 symmetrically connected to such cab 110 instead of two or four counterweights as previously described. Each cab 110 can be guided along two opposing guide tracks 230 by two or more guide apparatuses 220 attached to each exterior side 430 of each cab 110.

A computer control system described in U.S. Provisional Application No. 61/829,996, filed May 31, 2013, controls the motions, destinations, breaking and other functions of the elevator cabs 110 in each hoistway 100.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An elevator system comprising:
   one or more elevator shafts;
   two or more elevator cabs positioned within each of said one or more elevator shafts, said two or more elevator cabs including at least a first elevator cab positioned above a second elevator cab, each of said two or more cabs having at least two walls that are substantially parallel to each other, and each cab moves independently of each other vertically through each elevator shaft;
   two or more cables connected to each elevator cab, at least one of said cables positioned on a first wall of the at least two walls of each elevator cab and at least another of said cables positioned on a second wall of the at least two walls of each elevator cab, the first wall being substantially parallel to the second wall;
   two or more vertical guide tracks, at least one of said vertical guide tracks positioned on each of at least two vertical shaft walls of each elevator shaft, guide each elevator cab independently and vertically through each elevator shaft;
   one or more pulleys positioned to engage at least one cable of the two or more cables connected to each cab;
   one or more counterweights connected to each cab by at least one pulley of the one or more pulleys;
   two or more counterweight channels positioned external to a vertical path of the elevator cabs, wherein said two or more counterweight channels, each including at least one counterweight, are positioned side by side or back to back along at least one side of an elevator shaft permitting the two or more elevator cabs to move independently through a same elevator shaft; and
   one or more lift motors connected to at least one cable of the two or more cables connected to each cab, each cable that is connected to a lift motor is not connected to a counterweight.

2. The elevator system of claim 1, wherein each of said elevator cabs further comprises:
   one or more guides, positioned on said first wall of the elevator cab, for engaging a first vertical track located on a first shaft wall of a first elevator shaft; and
   one or more guides, positioned on said second wall of the elevator cab, for engaging a second vertical track located on a second shaft wall of said first elevator shaft, wherein the first shaft wall is substantially parallel to the second shaft wall.

3. The elevator system of claim 2, wherein each guide further comprises:
   at least one wheel, at least one axle and a U-shaped prong with a first arm and a second arm,
   wherein the at least one axle is positioned through a center of the at least one wheel and is attached to each arm of the prong, wherein the guide engages with a respective vertical track of either the first vertical track or the second vertical track, so that at least one wheel rolls along each respective vertical track while each respective vertical track is positioned between each arm of the prong, thus guiding the elevator cab along each respective vertical track through an elevator shaft.

4. The elevator system of claim 3, wherein the guide further comprises at least two washers.

5. The elevator system of claim 2, wherein said first vertical track is positioned substantially along a centerline of said first shaft wall and said second vertical track is positioned substantially along a centerline of said second shaft wall.

6. The elevator system of claim 1, wherein at least one counterweight channel of the two or more counterweight channels are attached to each of two or more elevator shaft walls, such that one or more of the counterweight channels is attached to a first elevator shaft wall and one or more of the counterweight channels is attached to a second elevator shaft wall, the first elevator shaft wall being parallel to the second elevator shaft wall.

7. The elevator system of claim 1, further comprising a control system for the movement and operation of each cab.

8. The elevator system of claim 7, wherein the control system controls a plurality of operations and motions of the cabs in each elevator shaft.

9. The elevator system of claim 1, further comprising a plurality of counterweights moving independently of each other in different vertical sections of a counterweight channel.

10. The elevator system of claim 9, wherein each counterweight channel is shareable by two or more counterweights moving independently of each other in the counterweight channel, wherein an upper counterweight is vertically aligned above a lower counterweight.

11. The elevator system of claim 10, wherein each lower counterweight is attached to at least two cables of the two or more cables connected to the elevator cab, such that the at least two cables attached to each lower counterweight in the counterweight channel pass through counterweight passages in each upper counterweight so that the two or more counterweights can move independently of each other in different vertical sections of the counterweight channel.

12. The elevator system of claim 1, wherein one or more of said cables connected to an associated counterweight is attached to a connection point that extends from an exterior of said first wall of each elevator cab, and
   one or more of said cables connected to an associated counterweight is attached to a connection point that extends from an exterior of said second wall of each elevator cab.

13. The elevator system of claim 12, wherein each connection point is positioned at an end of an element which extends from the exterior of each parallel wall of each cab and away from said vertical path of elevator cabs.

14. The elevator system of claim 13, wherein the element is in a shape of a rod that extends outward from an exterior wall of the cab.

15. The elevator system of claim 12, wherein centerlines of each connection point, cable, pulley and counterweight channel, are aligned with a longitudinal centerline of a respective counterweight, and the respective counterweight moves in a vertical path that is external to the vertical path of a respective elevator cab moving in the same elevator shaft.

16. The elevator system of claim 15, wherein one-half of the counterweights, channels, cables and pulleys are aligned along a parallel first shaft wall of a first elevator shaft, and the remaining one-half are aligned along an opposing parallel second shaft wall of the first elevator shaft.

17. The elevator system of claim 12, wherein each connection point is positioned horizontally or vertically away from every other connection point.

18. The elevator system of claim 1, wherein an elevator shaft is dedicated to private elevator cabs, each of the private elevator cabs for use only by occupants of a group of vertically adjoining floors in a structure, so that each private elevator cab moves independently only among the group of vertically adjoining floors.

19. The elevator system of claim 18, further comprising two private elevator cabs for each group of vertically adjoining floors in a structure, therein having a first shareable elevator slot and a second shareable elevator slot for each group of vertically adjoining floors, and each first shareable elevator slot and each second shareable elevator slot can be shared by adjacent private elevator cabs at different times.

20. The elevator system of claim 1, wherein each of said cables is horizontally separated from each other.

21. The elevator system of claim 1, wherein each lift motor connected to an associated elevator cab is capable of moving the associated elevator cab in a direction in response to activation of the lift motor.

22. The elevator system of claim 1, wherein the at least one cable connected to an associated lift motor that is attached to each cab is located next to a guide attached to either the first wall or the second wall of said cab.

23. The elevator system of claim 1, wherein during movement of each cab, no portion of any cable is stored.

24. The elevator system of claim 1, wherein a first lift cable is connected to a first location on an exterior of a third wall of an elevator cab, and a second lift cable is connected to a second location on an exterior of a fourth wall of said elevator cab, said second location positioned symmetrically to the first location, wherein the third and fourth walls of said cab are substantially parallel.

25. The elevator system of claim 1, wherein a first cable of the two or more cables connected to each cab and a second cable of the two or more cables connected to each cab, are each connected to a same lift motor, and said lift motor pulls said first and second cables in unison.

26. The elevator system of claim 1, wherein all elevator cabs only move in a same direction through an elevator shaft at a same time.

27. The elevator system of claim 1, wherein one or more elevator cabs can be stored in one or more upper elevator shaft slots and in one or more lower elevator shaft slots, so that each utilized floor in a structure is accessible by all elevator cabs.

28. The elevator system of claim 1, wherein one or more elevator cabs can be stored in one or more upper elevator shaft slots or in one or more lower elevator shaft slots.

29. The elevator system of claim 1, wherein each of said cables is either horizontally or vertically separated from each other.

30. The elevator system of claim 1, wherein one or more of said cables connected to a cab is connected to a lift motor, and one or more of said cables connected to a cab is connected by a pulley to a counterweight.

31. The elevator system of claim 1, wherein each cable is comprised of carbon fiber.

32. The elevator system of claim 1, wherein each cable that is connected to a lift motor is also attached to one or more connection points on an elevator cab.

33. The elevator system of claim 1, wherein two or more cables are each connected to a respective counterweight, a respective lift motor or a respective connection point.

34. The elevator system of claim 1, wherein two or more counterweights of said one or more counterweights are positioned symmetrically along two opposing sides of an elevator cab.

35. The elevator system of claim 1, comprising a set of two or more counterweight channels, wherein each counterweight channel guides at least one counterweight through an elevator shaft and is horizontally separated from every other counterweight channel.

36. The elevator system of claim 1, wherein two or more counterweight channels are positioned side by side or back to back along two opposing sides of an elevator shaft permitting two or more elevator cabs to move independently through the same shaft.

37. The elevator system of claim 1, wherein each elevator cab further comprises: one or more data cables, and one or more electric power cables.

38. The elevator system of claim 1, wherein counterweights and counterweight channels are constructed in different shapes in order to maximize the number of elevator cabs operable in a shaft.

39. The elevator system of claim 1, wherein all cables, counterweights, channels and pulleys are positioned symmetrically with respect to two opposing sides of each cab, and positioned horizontally or vertically from each other in order to achieve optimum balance of cabs and so as not to interfere with each other.

40. The elevator system of claim 1, wherein each of a plurality of elevator cabs moves different limited distances through an elevator shaft allowing passengers to transfer to other cabs in other shafts in order to travel from one floor to another floor in a structure.

41. The elevator system of claim 1, wherein at least one of the elevator cabs is expressed from a lower floor to an upper floor without stopping at intervening floors, hereinafter referred to as an expressed cab, whereby the expressed cab services a group of local upper floors and then expresses back to a lower floor.

42. The elevator system of claim 1, wherein one or more elevator cabs can move different limited distances through a designated vertical section of an elevator shaft, so that only occupants of designated vertically adjoining floors of a structure can access said elevator cabs.

43. The elevator system of claim 1, wherein at least one of the cables of the two or more cables connected to a cab is connected to a first lift motor and at least one other cable of said cables is connected to a counterweight.

44. The elevator system of claim 1, wherein each elevator cab includes a collision prevention means and a braking means.

45. An elevator system comprising:
one or more elevator shafts;
a plurality of elevator cabs positioned within at least one of said one or more elevator shafts, said plurality of elevator cabs including at least a topmost first elevator cab positioned above a second elevator cab, each of said cabs having at least two walls that are substantially parallel to each other;
the topmost first elevator cab suspended from one or more cables connected to a top surface of the topmost first elevator cab;
each elevator cab that is below the topmost first elevator cab suspended from two or more cables connected to each said elevator cab, at least one of said cables positioned on a first wall of the at least two walls and at least another of said cables positioned on a second wall of the at least two walls of each elevator cab below the topmost first elevator cab, the first wall being substantially parallel to the second wall;
two or more vertical guide tracks, at least one of said vertical guide tracks positioned on each of at least two vertical shaft walls of each elevator shaft, guide each elevator cab independently and vertically through each elevator shaft;
one or more pulleys each positioned to engage at least one cable connected to each of the cabs;
one or more counterweights connected to each cab;

two or more counterweight channels positioned external to a vertical path of the elevator cabs, wherein said two or more counterweight channels, each including at least one counterweight, are positioned side by side or back to back along at least one side of an elevator shaft permitting two or more elevator cabs to move independently through a same shaft;

one or more lift motors connected to at least one cable of the cables connected to each cab, each of the cables that is connected to the one or more lift motors is not connected to any of the one or more counterweights; and a control system for the movement and operation of each cab.

46. The elevator system of claim 45, wherein the control system controls a plurality of operations and motions of the cabs in each elevator shaft.

47. An elevator system comprising:
one or more elevator shafts;
two or more elevator cabs positioned within each of said one or more elevator shafts, said two or more elevator cabs including at least a first elevator cab positioned above a second elevator cab, each of said two or more cabs having at least two walls that are substantially parallel to each other, and each cab moves independently of each other cab vertically through each elevator shaft;

two or more cables connected to each elevator cab, at least one of said cables positioned on a first wall of the at least two walls of each elevator cab and at least another of said cables positioned on a second wall of the at least two walls of each elevator cab, the first wall being substantially parallel to the second wall;

two or more vertical guide tracks, at least one of said vertical guide tracks positioned on each of at least two vertical shaft walls of each elevator shaft, guide each elevator cab independently and vertically through each elevator shaft;

one or more pulleys positioned to engage at least one cable of the two or more cables connected to each cab;

one or more counterweights connected by at least one pulley of the one or more pulleys to each cab;

one or more counterweight channels positioned external to a vertical path of the elevator cabs;

one or more lift motors connected to at least one cable of the two or more cables connected to each cab, each cable that is connected to a lift motor is not connected to a counterweight; and a control system for the movement and operation of each cab;

wherein one or more of said cables connected to an associated counterweight is attached to a connection point that extends from an exterior of said first wall of each elevator cab, and one or more of said cables connected to an associated counterweight is attached to a connection point that extends from an exterior of said second wall of each elevator cab;

wherein each elevator cab from a top plan view is sectioned into quadrants and a same number of said connection points are located on each parallel wall that is positioned within each quadrant of each elevator cab.

48. The elevator system of claim 47, wherein each adjacent connection point that is located within each quadrant is separated from an adjacent connection point by a same distance.

49. The elevator system of claim 48, wherein each cable that is connected to an associated counterweight comprises a first end and a second end, wherein the first end is connected to an associated connection point on a cab and the second end is connected to the associated counterweight.

50. An elevator system comprising:
one or more elevator shafts;
two or more elevator cabs positioned within each of said one or more elevator shafts, said two or more elevator cabs including at least a first elevator cab positioned above a second elevator cab, each of said two or more cabs having at least two walls that are substantially parallel to each other, and each cab moves independently of each other cab vertically through each elevator shaft;

two or more cables connected to each elevator cab, at least one of said cables positioned on a first wall of the at least two walls of each elevator cab and at least another of said cables positioned on a second wall of the at least two walls of each elevator cab, the first wall being substantially parallel to the second wall;

two or more vertical guide tracks, at least one of said vertical guide tracks positioned on each of at least two vertical shaft walls of each elevator shaft, guide each elevator cab independently and vertically through each elevator shaft;

one or more pulleys positioned to engage at least one cable of the two or more cables connected to each cab;

one or more counterweights connected by at least one pulley of the one or more pulleys to each cab;

one or more counterweight channels positioned external to a vertical path of the elevator cabs;

one or more lift motors connected to at least one cable of the two or more cables connected to each cab, each cable that is connected to a lift motor is not connected to a counterweight; and a control system for the movement and operation of each cab;

wherein the two or more cables connected to each cab comprises a set of four cables and each cable of said set is connected to a separate counterweight.

51. The elevator system of claim 50, wherein two cables of said set of four cables are connected to associated counterweights which are positioned on the first wall of each elevator cab and the other two cables of said set of four cables are connected to associated counterweights which are positioned on the second wall of each elevator cab.

52. The elevator system of claim 50, wherein two or more elevator cabs are vertically aligned above a plurality of additional elevator cabs.

53. An elevator system comprising:
one or more elevator shafts;
two or more elevator cabs positioned within each of said one or more elevator shafts, said two or more elevator cabs including at least a first elevator cab positioned above a second elevator cab, each of said two or more cabs having at least two walls that are substantially parallel to each other, and each cab moves independently of each other cab vertically through each elevator shaft;

two or more cables connected to each elevator cab, at least one of said cables positioned on a first wall of the at least two walls of each elevator cab and at least another of said cables positioned on a second wall of the at least two walls of each elevator cab, the first wall being substantially parallel to the second wall;

two or more vertical guide tracks, at least one of said vertical guide tracks positioned on each of at least two vertical shaft walls of each elevator shaft, guide each elevator cab independently and vertically through each elevator shaft;

one or more pulleys positioned to engage at least one cable of the two or more cables connected to each cab;

one or more counterweights connected by at least one pulley of the one or more pulleys to each cab;

one or more counterweight channels positioned external to a vertical path of the elevator cabs;

one or more lift motors connected to at least one cable of the two or more cables connected to each cab, each cable that is connected to a lift motor is not connected to a counterweight; and a control system for the movement and operation of each cab;

wherein ten or more elevator cabs are vertically aligned in at least a first elevator shaft and each elevator cab can move independently of each other elevator cab in different sections of the at least first elevator shaft.

54. The elevator system of claim 53, wherein the two or more cables for each cab comprise:

a first subset of ten or more cables, each of which is connected to an associated counterweight and is attached to an associated connection point that extends from an exterior of said first wall of each of the ten or more elevator cabs, and a second subset of ten or more cables, each of which is connected to an associated counterweight and is attached to an associated connection point that extends from an exterior of said second wall of each of the ten or more elevator cabs.

55. The elevator system of claim 53, wherein ten or more counterweight channels, each including at least one counterweight, are positioned side by side or back to back along at least one side of an elevator shaft permitting ten or more elevator cabs to move independently through a same shaft.

56. The elevator system of claim 53, wherein the two or more cables for each cab comprise:

a first subset of ten or more cables, each of which is connected to an associated motor and is attached to an associated connection point that extends from an exterior of said first wall of each of the ten or more elevator cabs, and a second subset of ten or more cables, each of which is connected to an associated counterweight and is attached to an associated connection point that extends from an exterior of said second wall of each of the ten or more elevator cabs.

57. An elevator system comprising:

one or more elevator shafts;

two or more elevator cabs positioned within each of said one or more elevator shafts, said two or more elevator cabs including at least a first elevator cab positioned above a second elevator cab, each of said two or more cabs having at least two walls that are substantially parallel to each other, and each cab moves independently of each other cab vertically through each elevator shaft;

two or more cables connected to each elevator cab, at least one of said cables positioned on a first wall of the at least two walls of each elevator cab and at least another of said cables positioned on a second wall of the at least two walls of each elevator cab, the first wall being substantially parallel to the second wall;

two or more vertical guide tracks, at least one of said vertical guide tracks positioned on each of at least two vertical shaft walls of each elevator shaft, guide each elevator cab independently and vertically through each elevator shaft;

one or more pulleys positioned to engage at least one cable of the two or more cables connected to each cab;

one or more counterweights connected by at least one pulley of the one or more pulleys to each cab;

one or more counterweight channels positioned external to a vertical path of the elevator cabs;

one or more lift motors connected to at least one cable of the two or more cables connected to each cab, each cable that is connected to a lift motor is not connected to a counterweight; and a control system for the movement and operation of each cab;

wherein twenty or more elevator cabs are vertically aligned in at least a first elevator shaft and each elevator cab can move independently of each other elevator cab in different sections of the at least first elevator shaft.

58. The elevator system of claim 57, wherein twenty or more counterweight channels, each including at least one counterweight, are positioned side by side or back to back along at least one side of an elevator shaft permitting twenty or more elevator cabs to move independently through a same shaft.

59. The elevator system of claim 57, wherein the two or more cables for each cab comprise:

a first subset of twenty or more cables, each of which is connected to an associated counterweight and is attached to an associated connection point that extends from the exterior of said first wall of each of the twenty or more elevator cabs, and a second subset of twenty or more cables, each of which is connected to an associated counterweight and is attached to an associated connection point that extends from the exterior of said second wall of each of the twenty or more elevator cabs.

60. The elevator system of claim 57, wherein the two or more cables for each cab comprise:

a first subset of twenty or more cables, each of which is connected to an associated motor and is attached to an associated connection point that extends from the exterior of said first wall of each of the twenty or more elevator cabs, and a second subset of twenty or more cables, each of which is connected to an associated counterweight and is attached to an associated connection point that extends from the exterior of said second wall of each of the twenty or more elevator cabs.

* * * * *